United States Patent
Jin et al.

(10) Patent No.: US 12,425,977 B2
(45) Date of Patent: Sep. 23, 2025

(54) POWER CONFIGURATION METHOD AND APPARATUS

(71) Applicant: HUAWEI TECHNOLOGIES CO., LTD., Guangdong (CN)

(72) Inventors: Le Jin, Shanghai (CN); Zhilin Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 18/043,560

(22) PCT Filed: Aug. 5, 2021

(86) PCT No.: PCT/CN2021/110937
§ 371 (c)(1),
(2) Date: Feb. 28, 2023

(87) PCT Pub. No.: WO2022/042257
PCT Pub. Date: Mar. 3, 2022

(65) Prior Publication Data
US 2023/0269669 A1    Aug. 24, 2023

(30) Foreign Application Priority Data

Aug. 31, 2020 (CN) .......................... 202010899861.3

(51) Int. Cl.
*H04W 52/14* (2009.01)
*H04W 52/24* (2009.01)
*H04W 52/36* (2009.01)

(52) U.S. Cl.
CPC ......... *H04W 52/146* (2013.01); *H04W 52/24* (2013.01); *H04W 52/367* (2013.01)

(58) Field of Classification Search
CPC . H04W 52/146; H04W 52/24; H04W 52/367; H04W 52/242; H04W 52/241;
(Continued)

(56) References Cited

U.S. PATENT DOCUMENTS 11,924,768 B2 *  3/2024  Xing ..................... H04W 52/38
2011/0243007 A1  10/2011  Xiao
(Continued)

FOREIGN PATENT DOCUMENTS

CN      110475330 A    11/2019
CN      110972245 A    4/2020
(Continued)

OTHER PUBLICATIONS

Huawei, HiSilicon et al., "Remaining details of UL power control design",3GPP TSG RAN WG1 Meeting #93 , Busan, Korea, May 21-25, 2018, R1-1805963, total:6pages.
(Continued)

*Primary Examiner* — Lewis G West

(57) ABSTRACT

This application provides a power configuration method and an apparatus, so that a terminal device is enabled to allocate as much uplink transmit power as possible to a first port, and allocate first transmit power as transmit power of a second port, so that total transmit power of the terminal device reaches calculated transmit power indicated by a network device for sending; or both the first port and the second port are enabled to be used to perform sending by using respective maximum transmit power supported by the first port and the second port, so that receive power of the network device to receive an uplink signal is maximized, thereby improving uplink performance.

20 Claims, 8 Drawing Sheets

---

S301: A terminal device determines, based on first information, to use a first port to perform uplink sending S302: When maximum transmit power supported by the first port is greater than calculated transmit power, the terminal device uses the first port to perform uplink sending S303: When the maximum transmit power of the first port is less than the calculated transmit power, perform uplink sending through the first port by using the maximum transmit power supported by the first port, and perform uplink sending through a second port of the terminal device by using first transmit power

(58) Field of Classification Search
CPC ............ H04W 52/245; H04W 52/247; H04W 52/346; H04W 52/42; H04B 7/0456
See application file for complete search history.

(56) References Cited

U.S. PATENT DOCUMENTS

| | | | | |
|---|---|---|---|---|
| 2012/0082043 | A1* | 4/2012 | Hwang | H04W 24/10 |
| | | | | 370/252 |
| 2013/0100828 | A1 | 4/2013 | Kishiyama et al. | |
| 2021/0105767 | A1* | 4/2021 | Guan | H04W 36/0058 |
| 2021/0352596 | A1* | 11/2021 | Liu | H04W 52/146 |
| 2022/0007298 | A1* | 1/2022 | Huang | H04W 52/40 |
| 2022/0015039 | A1* | 1/2022 | Huang | H04W 52/367 |
| 2022/0182950 | A1* | 6/2022 | Huang | H04W 52/42 |
| 2022/0287059 | A1* | 9/2022 | Huang | H04W 52/146 |
| 2022/0303981 | A1* | 9/2022 | Sakhnini | H04W 72/51 |
| 2023/0209474 | A1* | 6/2023 | Shah | H04L 5/006 |
| | | | | 370/318 |
| 2024/0007843 | A1* | 1/2024 | Shen | H04B 17/328 |
| 2024/0049145 | A1* | 2/2024 | Xu | H04W 52/325 |
| 2024/0430810 | A1* | 12/2024 | Fan | H04W 52/42 |
| 2025/0133600 | A1* | 4/2025 | He | H04W 74/08 |

FOREIGN PATENT DOCUMENTS

| | | |
|---|---|---|
| CN | 111510935 A | 8/2020 |
| EP | 2484161 A2 | 8/2012 |
| WO | 2019214648 A1 | 11/2019 |

OTHER PUBLICATIONS

Qualcomm Incorporated et al.,:Remaining issues on full power UL transmissions, 3GPP TSG RAN WG1 #101,e-Meeting, May 25-Jun. 5, 2020,R1-2004465,total:9pages.

* cited by examiner

POWER CONFIGURATION METHOD AND APPARATUS

CROSS-REFERENCE TO RELATED APPLICATIONS

This application is a national stage of International Application No. PCT/CN2021/110937 filed on Aug. 5, 2021, which claims priority to Chinese Patent Application No. 202010899861.3 filed on Aug. 31, 2020. Both of the aforementioned applications are hereby incorporated by reference in their entireties.

TECHNICAL FIELD

This application relates to the field of wireless communications technologies, and in particular, to a power configuration method and apparatus.

BACKGROUND

With the development of mobile communications technologies, uplink transmission also gradually supports a multi-antenna technology, so as to improve spectral efficiency, an uplink throughput, and a system capacity. The $1^{st}$ protocol version of new radio (new radio, NR) supports up to four layers of multi-input multi-output (multi-input multi-output, MIMO) transmission in an uplink. If a terminal supports MIMO, the terminal requires a plurality of transmit antennas, where each transmit antenna is connected to one power amplifier (power amplifier, PA), and maximum transmit power of the terminal is a sum of linear values of maximum transmit power of all antennas. For example, if the terminal supports two antennas for sending, and maximum transmit power of each antenna is 23 dBm (dBm/dBmW), the maximum transmit power of the terminal is 26 dBm.

Uplink channels experienced by different antennas of a same terminal are not necessarily the same. For example, in a typical scenario of a handheld terminal, some antennas are held by hand, resulting in large signal attenuation. Consequently, uplink channels of these antennas have greater attenuation compared with an antenna that is not held by hand, that is, a path loss (path loss) is greater.

Because respective uplink path losses of different uplink ports are different, when a terminal device evenly allocates uplink transmit power to a plurality of uplink ports according to a power allocation solution in a conventional technology, optimal uplink transmission performance cannot be obtained.

SUMMARY

This application provides a power configuration method and apparatus, to improve uplink transmission performance.

According to a first aspect, an embodiment of this application provides a communications method. The method may be performed by a first terminal device or a component (such as a processor, a chip, or a chip system) in the first terminal device. For the first terminal device, there is to-be-sent uplink information needing to be sent.

The following uses an example in which an execution body is the first terminal device for description. According to the method, the terminal device may determine, based on first information, to use a first port to perform uplink sending.

When maximum transmit power supported by the first port is greater than calculated transmit power, the terminal device performs uplink sending by using the first port, where the calculated transmit power is uplink transmit power indicated by a network device.

When the maximum transmit power of the first port is less than the calculated transmit power, uplink sending is performed through the first port by using the maximum transmit power supported by the first port, and uplink sending is performed through a second port of the terminal device by using first transmit power, where when transmission is performed through the first port by using the maximum power and uplink sending is performed through the second port by using the first transmit power, total transmit power of the terminal device is enabled to be the calculated transmit power, or the first transmit power is maximum transmit power supported by the second port. The first information includes at least one or more of the following: an SNR, an uplink path loss, an RSSI, RSRP, RSCP, precoding and layer quantity information, and SRS resource indicator information.

By using the foregoing method, the terminal device allocates as much uplink transmit power as possible to the first port, and allocates the first transmit power as the transmit power of the second port, so that the total transmit power of the terminal device reaches the calculated transmit power indicated by the network device for sending; or enables both the first port and the second port to be used to perform sending by using respective maximum transmit power supported by the first port and the second port, so that receive power of the network device to receive an uplink signal is maximized, thereby improving uplink performance.

In a possible design, a plurality of ports of the terminal device are in a one-to-one correspondence with a plurality of antennas, and the plurality of ports include the first port and the second port.

In a possible design, when the first information includes the SNR, the terminal device selects, from the plurality of ports of the terminal device, a port with a largest SNR as the first port. Alternatively, when the first information includes the uplink path loss, the terminal device selects, from the plurality of ports of the terminal device, a port with a smallest uplink path loss as the first port. Alternatively, when the first information includes the RSSI, the terminal device selects, from the plurality of ports of the terminal device, a port with a largest RSSI as the first port. Alternatively, when the first information includes the RSRP, the terminal device selects, from the plurality of ports of the terminal device, a port with largest RSRP as the first port. Alternatively, when the first information includes the RSCP, the terminal device selects, from the plurality of ports of the terminal device, a port with largest RSCP as the first port.

In a possible design, when the first information includes the SNR, and the first port is not a port with a largest SNR in a plurality of uplink ports of the terminal device, the terminal device selects, from the plurality of ports of the terminal device, a port with a second largest SNR as the second port. Alternatively, when the first information includes the uplink path loss, and the first port is not a port with a smallest uplink path loss in a plurality of uplink ports of the terminal device, the terminal device selects, from the plurality of ports of the terminal device, a port with a second smallest uplink path loss as the second port. Alternatively, when the first information includes the RSSI, and the first port is not a port with a largest RSSI in a plurality of uplink ports of the terminal device, the terminal device selects, from the plurality of ports of the terminal device, a port with a second largest RSSI as the second port. Alternatively, when the first information includes the RSRP, and the first port is not a port with largest RSRP in a plurality of uplink ports of the terminal device, the terminal device selects, from the plurality of ports of the terminal device, a port with second largest RSRP as the second port. Alternatively, when the first information includes the RSCP, and the first port is not a port with largest RSCP in a plurality of uplink ports of the terminal device, the terminal device selects, from the plurality of ports of the terminal device, a port with second largest RSCP as the second port.

In a possible design, when determining, based on the first information, to use the first port and the second port to perform uplink sending, the terminal device performs uplink sending through the first port by using third transmit power, and performs uplink sending through the second port by using the third transmit power, where when uplink sending is performed through the first port and the second port by using the third transmit power, the total transmit power of the terminal device is enabled to be the calculated transmit power. Alternatively, uplink sending is performed through the first port by using the maximum transmit power supported by the first port, and uplink sending is performed through the second port by using third transmit power. Alternatively, uplink sending is performed through the first port by using third transmit power, and uplink sending is performed through the second port by using the maximum transmit power supported by the second port. Alternatively, uplink sending is performed through the first port by using the maximum transmit power supported by the first port, and uplink sending is performed through the second port by using the maximum transmit power supported by the second port.

By using this design, sending may be performed by using two uplink ports indicated by the network device, and the total transmit power reaches the calculated transmit power. Alternatively, when the transmit power of the first port and/or the second port are/is limited by the maximum transmit power, the network device is enabled to obtain larger receive power as far as possible, so as to improve uplink performance.

In a possible design, the first transmit power is represented as min $\{P_{max,j}, 10 \log (\hat{P}_{CH} - \hat{P}_{max,i})\}$.

$P_{max,j}$ represents the maximum transmit power of the second port. $\hat{P}_{CH}$ represents a linear value of the calculated transmit power, and the linear value of the calculated transmit power is determined based on the calculated transmit power. $\hat{P}_{max,i}$ represents a linear value of the maximum transmit power of the first port, and the linear value of the maximum transmit power of the first port is determined based on the maximum transmit power of the first port. min $\{a, b\}$ represents that a smallest value of a and b is used.

By using this design, uplink power received by the network device can be maximized, thereby further improving uplink performance.

In a possible design, the terminal device may determine that the first port and the second port meet a specific condition. When the first information includes the SNR, the specific condition includes: A difference between an SNR of the first port and an SNR of the second port is greater than a specified value, the SNR of the first port is greater than the SNR of the second port, and the specified value is greater than 0. When the first information includes the uplink path loss, the specific condition includes: A difference between an uplink path loss of the second port and an uplink path loss of the first port is greater than a specified value, the uplink path loss of the second port is greater than the uplink path loss of the first port, and the specified value is greater than 0. When the first information includes the RSSI, the specific condition includes: A difference between an RSSI of the first port and an RSSI of the second port is greater than a specified value, and the RSSI of the first port is greater than the RSSI of the second port, and the specified value is greater than 0. When the first information includes the RSRP, the specific condition includes: A difference between RSRP of the first port and RSRP of the second port is greater than a specified value, the RSRP of the first port is greater than the RSRP of the second port, and the specified value is greater than 0. When the first information includes the RSCP, the specific condition includes: A difference between RSCP of the first port and RSCP of the second port is greater than a specified value, the RSCP of the first port is greater than the RSCP of the second port, and the specified value is greater than 0. By using this design, transmit power may be further properly allocated, so as to improve uplink transmission reliability.

In a possible design, the terminal device determines that the first port and the second port do not meet the foregoing specific condition. In this case, uplink sending is performed through the first port by using the third transmit power, and uplink sending is performed through the second port by using the third transmit power, where when uplink sending is performed through the first port and the second port by using the third transmit power, the total transmit power of the terminal device is enabled to be the calculated transmit power. Alternatively, uplink sending is performed through the first port by using the maximum transmit power supported by the first port, and uplink sending is performed through the second port by using the third transmit power. Alternatively, uplink sending is performed through the first port by using the third transmit power, and uplink sending is performed through the second port by using the maximum transmit power supported by the second port. Alternatively, uplink sending is performed through the first port by using the maximum transmit power supported by the first port, and uplink sending is performed through the second port by using the maximum transmit power supported by the second port. By using this design, transmit power may be further properly allocated, so as to improve uplink transmission reliability.

In a possible design, the third transmit power is $P_{CH}-3$. $P_{CH}$ represents the calculated transmit power. min $\{a, b\}$ represents that a smallest value of a and b is used.

According to a second aspect, an embodiment of this application provides a communications apparatus, to implement the method implemented by the first terminal device in any one of the first aspect or the possible implementations of the first aspect. The apparatus includes a corresponding unit or component for performing the foregoing method. Units included in the apparatus may be implemented in a software and/or hardware manner. The apparatus may be, for example, a terminal device, or a chip, a chip system, or a processor that can support the terminal device in implementing the foregoing method.

For example, the communications apparatus may include modular components such as a transceiver module (or referred to as a communications module, a transceiver unit, or the like) and a processing module (or referred to as a processing unit or a processor). These modules may perform corresponding functions of the first terminal device in the first aspect or the possible design examples of the first aspect.

When performing the method in the first aspect, the processing module may be configured to determine, based on first information, to use a first port to perform uplink sending. When maximum transmit power supported by the first port is greater than calculated transmit power, the processing module is configured to configure the first port to be used to perform uplink sending, where the calculated transmit power is uplink transmit power indicated by a network device. When the maximum transmit power of the first port is less than the calculated transmit power, the processing module is configured to: configure the first port to be used to perform uplink sending by using the maximum transmit power supported by the first port, and configure a second port of the terminal device to be used to perform uplink sending by using first transmit power. When transmission is performed through the first port by using the maximum power and uplink sending is performed through the second port by using the first transmit power, total transmit power of the terminal device is enabled to be the calculated transmit power, or the first transmit power is the maximum transmit power supported by the second port. The first information includes at least one or more of the following: an SNR (or SINR), an uplink path loss, an RSSI, RSRP, RSCP, precoding and layer quantity information, and SRS resource indicator information. The precoding and layer quantity information and the SRS resource indicator information may be received by the transceiver module.

In a possible design, when the first information includes the SNR (or SINR), the processing module may select, from a plurality of ports of the terminal device, a port with a largest SNR (or SINR) as the first port. Optionally, in this case, the processing module uses a port with a second largest SNR (or SINR) as the second port. Alternatively, when the first information includes the uplink path loss, the processing module selects, from a plurality of ports of the terminal device, a port with a smallest uplink path loss as the first port. Optionally, in this case, the processing module uses a port with a second smallest uplink path loss as the second port. Alternatively, when the first information includes the RSSI, the processing module selects, from a plurality of ports of the terminal device, a port with a largest RSSI as the first port. Optionally, in this case, the processing module uses a port with a second largest RSSI as the second port. Alternatively, when the first information includes the RSRP, the processing module selects, from a plurality of ports of the terminal device, a port with largest RSRP as the first port. Optionally, the processing module uses a port with second largest RSRP as the second port. Alternatively, when the first information includes the RSCP, the processing module selects, from a plurality of ports of the terminal device, a port with largest RSCP as the first port. Optionally, in this case, the processing module uses a port with second largest RSCP as the second port.

In a possible design, when the terminal device determines, based on the first information, to use the first port and the second port to perform uplink sending, the processing module may configure the first port to be used to perform uplink sending by using the third transmit power, and configure the second port to be used to perform uplink sending by using the third transmit power, where when uplink sending is performed through the first port and the second port by using the third transmit power, the total transmit power of the terminal device is enabled to be the calculated transmit power.

Alternatively, the processing module may configure the first port to be used to perform uplink sending by using the maximum transmit power supported by the first port, and configure the second port to be used to perform uplink sending by using the third transmit power.

Alternatively, the processing module may configure the first port to be used to perform uplink sending by using the third transmit power, and configure the second port to be used to perform uplink sending by using the maximum transmit power supported by the second port.

Alternatively, the processing module may configure the first port to be used to perform uplink sending by using the maximum transmit power supported by the first port, and configure the second port to be used to perform uplink sending by using the maximum transmit power supported by the second port.

In a possible design, the first transmit power may be represented as $\min \{P_{max,j}, 10 \log (\hat{P}_{CH} - \hat{P}_{max,i})\}$. $P_{max,j}$ represents the maximum transmit power of the second port. $\hat{P}_{CH}$ represents a linear value of the calculated transmit power, and the linear value of the calculated transmit power is determined based on the calculated transmit power. $\hat{P}_{max,i}$ represents a linear value of the maximum transmit power of the first port, and the linear value of the maximum transmit power of the first port is determined based on the maximum transmit power of the first port. $\min \{a, b\}$ represents that a smallest value of a and b is used.

In a possible design, the processing module may determine that the first port and the second port meet a specific condition. When the first information includes the SNR, the specific condition includes: A difference between an SNR of the first port and an SNR of the second port is greater than a specified value, the SNR of the first port is greater than the SNR of the second port, and the specified value is greater than 0. When the first information includes the uplink path loss, the specific condition includes: A difference between an uplink path loss of the second port and an uplink path loss of the first port is greater than a specified value, the uplink path loss of the second port is greater than the uplink path loss of the first port, and the specified value is greater than 0. When the first information includes the RSSI, the specific condition includes: A difference between an RSSI of the first port and an RSSI of the second port is greater than a specified value, and the RSSI of the first port is greater than the RSSI of the second port, and the specified value is greater than 0. When the first information includes the RSRP, the specific condition includes: A difference between RSRP of the first port and RSRP of the second port is greater than a specified value, the RSRP of the first port is greater than the RSRP of the second port, and the specified value is greater than 0. When the first information includes the RSCP, the specific condition includes: A difference between RSCP of the first port and RSCP of the second port is greater than a specified value, the RSCP of the first port is greater than the RSCP of the second port, and the specified value is greater than 0.

In a possible design, if the processing module determines that the second port and the first port do not meet the foregoing specific condition, the processing module may configure the first port to be used to perform uplink sending by using the third transmit power, and configure the second port to be used to perform uplink sending by using the third transmit power, where when uplink sending is performed through the first port and the second port by using the third transmit power, the total transmit power of the terminal device is enabled to be the calculated transmit power.

Alternatively, the processing module may configure the first port to be used to perform uplink sending by using the maximum transmit power supported by the first port, and configure the second port to be used to perform uplink sending by using the third transmit power.

Alternatively, the processing module may configure the first port to be used to perform uplink sending by using the third transmit power, and configure the second port to be used to perform uplink sending by using the maximum transmit power supported by the second port.

Alternatively, the processing module may configure the first port to be used to perform uplink sending by using the maximum transmit power supported by the first port, and configure the second port to be used to perform uplink sending by using the maximum transmit power supported by the second port.

In a possible design, the third transmit power may be represented as $P_{CH}-3$. $P_{CH}$ represents the calculated transmit power. min $\{a, b\}$ represents that a smallest value of a and b is used.

In another example, the communications apparatus may further include a transceiver and a processor. The processor is configured to support the communications apparatus in performing a corresponding function of the terminal device in the first aspect or the possible design examples of the first aspect, for example, generating information that needs to be sent by the transceiver, and/or processing information received by the transceiver. The transceiver may be configured to send and receive information or data, and is used by the communications apparatus to perform communications interaction with another communications apparatus (such as a network device) in a communications system. Optionally, the transceiver may be connected to the communications apparatus in an external connection manner. Optionally, the communications apparatus may further include a memory. The memory is coupled to the processor, and is configured to store program instructions and data that are necessary for the communications apparatus. The memory may be used as one of components of the communications apparatus or be externally connected to the communications apparatus. The processor may be configured to perform the steps performed by the processing unit in the second aspect, and the transceiver may be configured to perform the steps performed by the transceiver unit in the second aspect. The transceiver may include a signal processing unit, a radio frequency channel, and/or an antenna.

According to a third aspect, this application provides a computer storage medium. The computer storage medium stores a program. When the program is invoked and executed on a computer, the computer is enabled to perform the method in any one of the first aspect or the possible designs of the first aspect.

According to a fourth aspect, this application provides a computer program product. The computing base product may include a program or instructions. When the computer program product runs on a computer, the computer is enabled to perform the method in any one of the first aspect or the possible designs of the first aspect.

According to a fifth aspect, this application provides a chip or a chip system including a chip, where the chip may include a processor. The chip may further include a memory (or a storage module) and/or a transceiver (or a communications module). The chip may be configured to perform the method in any one of the first aspect or the possible designs of the first aspect. The chip system may include the foregoing chip, or may include the foregoing chip and another discrete component, such as a memory (or a storage module) and/or a transceiver (or a communications module).

For beneficial effects of the second aspect to the fifth aspect and the possible designs thereof, refer to descriptions of beneficial effects of the method in the first aspect and the possible designs thereof.

DESCRIPTION OF EMBODIMENTS

To properly allocate uplink antenna transmit power (or referred to as transmit power) and improve uplink transmission performance, this application provides a communications method. The following further describes in detail this application with reference to accompanying drawings. It should be understood that the specific operation method in the method embodiment described below may also be applied to the apparatus embodiment or the system embodiment.

Figure 1:
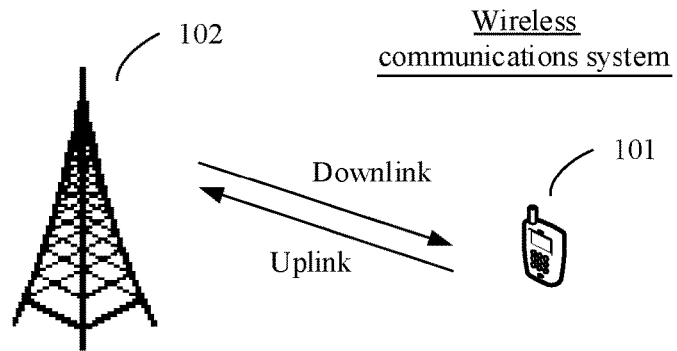
FIG. 1 is a schematic diagram of an architecture of a communications system according to an embodiment of this application.

As shown in FIG. 1, a measurement feedback method provided in an embodiment of this application may be applied to a wireless communications system. The wireless communications system may include a terminal device 101 and a network device 102.

It should be understood that the foregoing wireless communications system may be applicable to both a low frequency scenario (sub 6G) and a high frequency scenario (above 6G). An application scenario of the wireless communications system includes but is not limited to a fifth generation system, a new radio (new radio, NR) communications system, a future evolved public land mobile network (public land mobile network, PLMN) system, and the like.

The terminal device 101 shown above may be user equipment (user equipment, UE), a terminal (terminal), an access terminal, a terminal unit, a terminal station, or a mobile station (mobile station, MS), a remote station, a remote terminal, a mobile terminal, a wireless communications device, a terminal agent, or a terminal device. The terminal device 101 may have a wireless transceiver function, and can perform communication (for example, wireless communication) with one or more network devices in one or more communications systems, and receive a network service provided by the network device. The network device herein includes but is not limited to the network device 102 shown in the figure.

The terminal device 101 may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device, another processing device connected to a wireless modem, a vehicle-mounted device, a wearable device, a terminal device in a future 5G network, or a terminal device in a future evolved PLMN network, and or the like.

In addition, the terminal device 101 may be deployed on land, including indoors or outdoors, or in a handheld manner, or in a vehicle-mounted manner. The terminal device 101 may be alternatively deployed on a water surface (for example, on a ship). The terminal device 101 may be alternatively deployed in the air (for example, on an aircraft, a balloon, or a satellite). The terminal device 101 may be specifically a mobile phone (mobile phone), a tablet computer (pad), a computer with a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), and the like. Alternatively, the terminal device 101 may be a communications chip having a communications module, or may be a vehicle having a communications function, an in-vehicle device (such as an in-vehicle communications apparatus or an in-vehicle communications chip), or the like.

Figure 2:
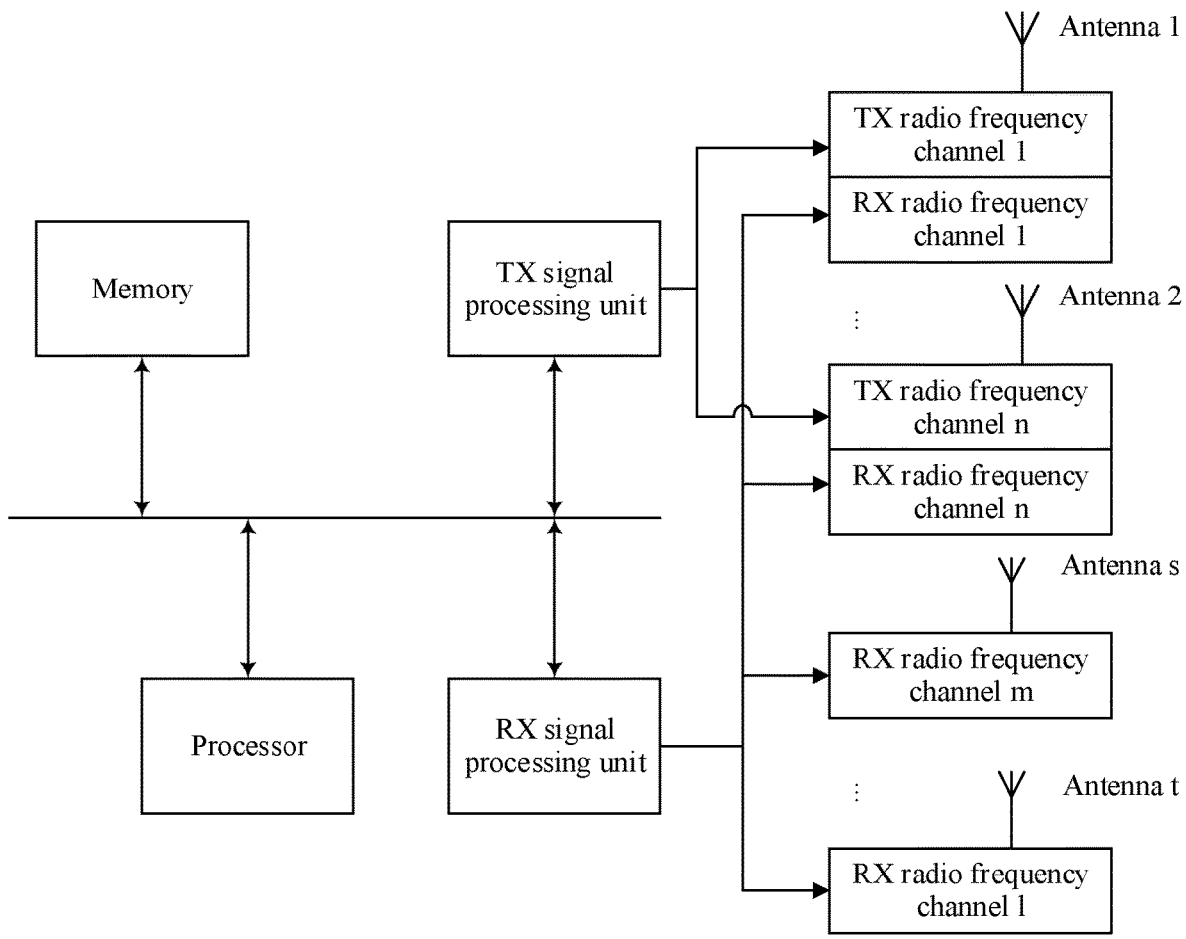
FIG. 2 is a schematic diagram of a structure of a terminal device according to an embodiment of this application.

FIG. 2 is a possible schematic diagram of a structure of a terminal device 101. It can be learned that the terminal device 101 may include a memory, a processor, a transmit (transport, Tx) signal processing unit (or a Tx signal processor), a receive (receive, Rx) signal processing unit (or an Rx signal processor), a Tx radio frequency channel (for example, a Tx radio frequency channel 1, a Tx radio frequency channel m, and a Tx radio frequency channel n shown in FIG. 2), an Rx radio frequency channel (for example, an Rx radio frequency channel 1, an Rx radio frequency channel m, an Rx radio frequency channel n, and an Rx radio frequency channel 1 shown in FIG. 2), and an antenna.

The memory may include a static memory configured to store executable code and data, or include a dynamic memory configured to store instructions and dynamic data.

The processor may be configured to invoke the executable code or the instructions stored in the memory, and control the Tx signal processing unit and the Rx signal processing unit to send and receive signals in a predefined manner.

The Tx signal processing unit may be configured to implement various signal processing functions of signal sending. The Rx signal processing unit may implement various signal processing functions of signal receiving.

The Tx radio frequency channel may be configured to transmit a to-be-sent radio frequency signal, and include, for example, the Tx radio frequency channel 1 to the Tx radio frequency channel n shown in FIG. 2. The Rx radio frequency channel may be configured to transmit a radio frequency signal received by an antenna, and includes, for example, the Rx radio frequency channel 1 to the Rx radio frequency channel n, an Rx radio frequency channel s, and an Rx radio frequency channel t shown in FIG. 2.

The antenna may be configured to perform sending and/or receiving of radio frequency signals, and include, for example, an antenna 1, an antenna 2, . . . , an antenna s, and an antenna t shown in FIG. 2.

As shown in FIG. 2, the Tx signal processing unit and the Rx signal processing unit are respectively connected to the antennas by using the Tx radio frequency channel and the Rx radio frequency channel. The Tx radio frequency channel may be configured to modulate a baseband signal to a carrier frequency, and send the baseband signal by using the antenna. The Rx radio frequency channel may be configured to demodulate a radio frequency signal received from the antenna into a baseband signal, and provide the baseband signal to the Rx signal processing unit for processing. Some (or all) of the antennas may be configured to simultaneously perform sending and receiving and are therefore connected to both the Tx radio frequency channel and the Rx radio frequency channel. For example, when two uplink ports are used for transmission, the antenna 1 and the antenna 2 shown in FIG. 2 may be respectively connected to the Tx radio frequency channel 1 and the Tx radio frequency channel n, and respectively connected to the Rx radio frequency channel 1 and the Rx radio frequency channel n. Some (or all) of the antennas are configured to perform receiving only and are therefore connected to only the Rx radio frequency channel, such as the antenna s and the antenna t shown in FIG. 2. In addition, the Tx radio frequency channel and the Rx radio frequency channel may be connected to any of the antennas. For example, the Tx radio frequency channel 1 and the Rx radio frequency channel 1 in FIG. 2 may be connected to the antenna 2 based on a service requirement, to implement flexible configuration. In addition, a design of four uplink ports (or more uplink ports) may be alternatively used based on an actual requirement, so that the four (or more) uplink ports are respectively connected to the Tx radio frequency channel and the Rx radio frequency channel.

FIG. 2 is described by using an example in which two antennas support sending and receiving, and two antennas support only receiving. It should not be understood as a limitation thereto.

The network device 102 may be an access network device (or referred to as an access network station). The access network device is a device, for example, a radio access network (radio access network, RAN) base station, that provides a network access function. The network device 102 may specifically include a base station (base station, BS), or include a base station, a radio resource management device configured to control the base station, and the like. The network device 102 may further include a relay station (a relay device), an access point, a base station in a future 5G network, a base station in a future evolved PLMN network, an NR base station, and the like. The network device 102 may be a wearable device or an in-vehicle device. Alternatively, the network device 102 may be a communications chip having a communications module.

For example, the network device 102 includes but is not limited to a next-generation base station (gNodeB, gNB) in 5G, an evolved node B (evolved NodeB, eNB) in an LTE system, a radio network controller (radio network controller, RNC), a radio controller in a CRAN system, a base station controller (base station controller, BSC), a home base station (for example, home evolved NodeB, or home node B, HNB), a baseband unit (baseband unit, BBU), a transmitting and receiving point (transmitting and receiving point, TRP), a transmitting point (transmitting point, TP), a mobile switching center, or the like. The network device 102 may alternatively include a base station in future 6G or a newer mobile communications system.

Figure 3:
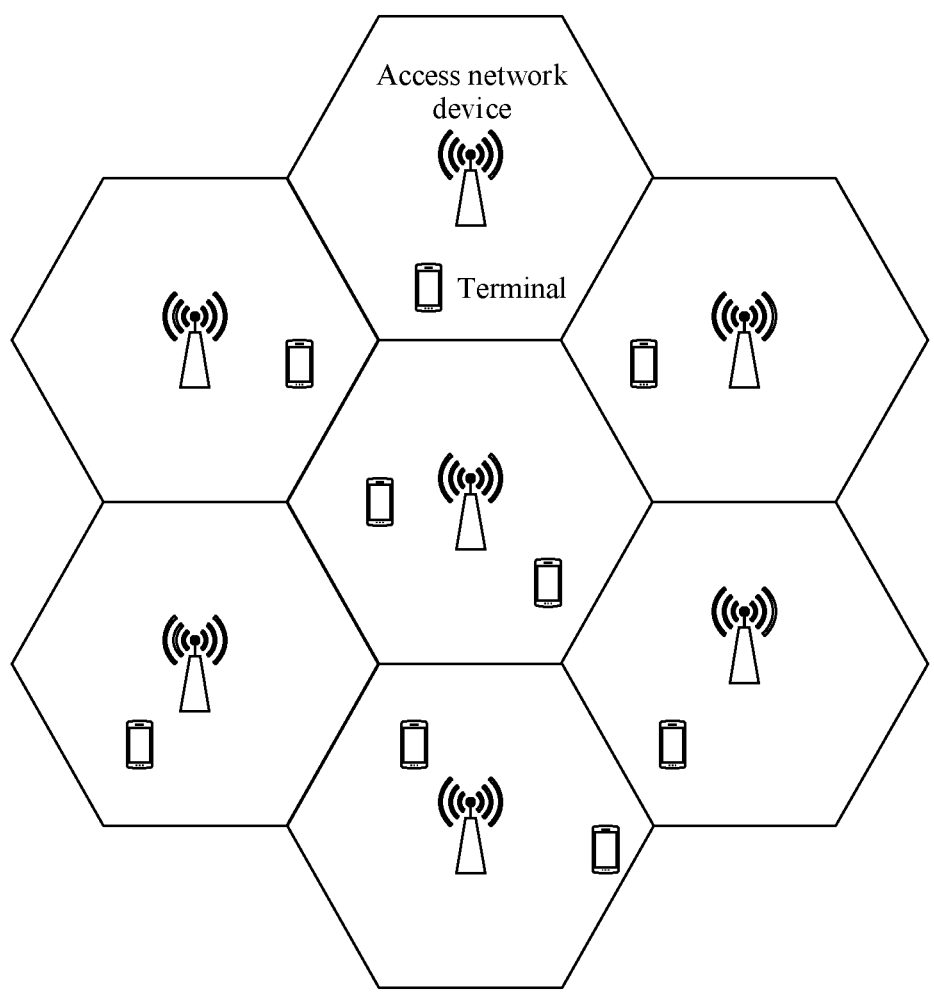
FIG. 3 is a schematic diagram of an architecture of another communications system according to an embodiment of this application.

FIG. 3 shows a network structure of a possible radio access network according to an embodiment of this application. In this instance, the access network is divided into cellular cells. A terminal in each cell and an access network device (such as a base station) of the cell are linked by using an air interface, and signaling and data exchange are performed by using the air interface. The access network may be based on a plurality of access technologies, and specifically depend on a used network standard. For example, in 5G NR, the access network device may be a gNB, and may use a multiple access manner of an orthogonal frequency division multiple access (orthogonal frequency division multiple access, OFDMA).

It should be understood that the terminal device herein may be implemented by the foregoing terminal device 101, and the access network device may be implemented by the foregoing network device 102.

Based on FIG. 3, the terminal device 102 may send a preamble (preamble) sequence by using a physical random access channel (physical random access channel, PRACH), to initiate a random access process. The PRACH is a single-port channel. However, when calculated transmit power of the PRACH exceeds maximum transmit power of a single port, the terminal may simultaneously send the PRACH on a plurality of ports in a diversity sending manner.

The calculated transmit power $P_{PRACH}$ of the PRACH is determined according to a protocol formula, and a unit is dBm:

$$P_{PRACH} = P_{PRACH,target} + PL$$

$P_{PRACH,target}$ represents target power expected to be received by the base station.

PL is a downlink path loss.

The terminal device 102 may alternatively send an uplink control channel (uplink control information, UCI) by using a physical uplink control channel (physical uplink control channel, PUCCH). Similarly, the PUCCH is a single-port channel. When calculated transmit power of the PUCCH exceeds maximum transmit power of a single port, the terminal may simultaneously send the PUCCH on a plurality of ports in a diversity sending manner.

The calculated transmit power $P_{PUCCH}$ of the PUCCH is determined according to a protocol formula, and a unit is dBm:

$$P_{PUCCH} = P_{0\_PUCCH} + 10 \log_{10}(2^\mu \cdot M_{RB}^{PUCCH}) + \alpha \cdot PL + \Delta_{TF} + g$$

$P_{0\_PUCCH}$ is a static working point of the base station, which is configured by the base station.

$10 \log_{10}(2^\mu \cdot M_{RB}^{PUCCH})$ reflects impact of PUCCH bandwidth on power.

$\alpha$ is a path loss compensation factor.

$\Delta_{TF}$ reflects impact of a PUCCH code rate on transmit power.

$M_{RB}^{PUCCH}$ represents a quantity of PUCCH RBs.

g is a power control adjustment amount introduced by a power control command word.

Based on FIG. 3, the access network device 102 may dynamically schedule, by using downlink control information (downlink control information, DCI) format 0_0 and DCI format 0_1 carried on a physical downlink control channel (physical downlink control channel, PDCCH), sending of a physical uplink shared channel (physical uplink shared channel, PUSCH) to implement uplink transmission. When the access network device schedules the sending of the PUSCH by using the DCI format 0_0, the PUSCH is sent by using a single port, and the terminal may send the PUSCH on a plurality of ports simultaneously in a diversity sending manner. When the access network device schedules the sending of the PUSCH by using the DCI format 0_1, the PUSCH supports MIMO sending, and there are two manners: codebook-based uplink transmission and non-codebook-based uplink transmission.

In a codebook-based uplink transmission manner, the terminal device sends a sounding reference signal (sounding reference signal, SRS) to the network device (such as a base station) by using each uplink port, and the network device performs uplink channel estimation by using the SRS, calculates a quantity of layers and a precoding matrix, and notifies the terminal device of the quantity of layers and the precoding matrix by using the precoding and layer quantity information (precoding information and number of layers). The terminal device precodes uplink information by using the quantity of layers and the precoding matrix that are indicated by the network device, to implement MIMO transmission. The precoding matrix is a series of precoding matrices specified in a protocol, that is, one of codebooks. The network device selects an optimal precoding matrix, so that uplink transmission efficiency is highest in the case of a current channel condition. The precoding matrix is indexed (index) by a transmitted precoding matrix indicator (transmitted precoding matrix indicator, TPMI). Table 1 shows precoding matrices of TPMI indexes when the terminal device supports four ports in an uplink and the network device schedules one layer of configuration.

TABLE 1

| TPMI index | Precoding matrix W (from left to right, respectively corresponding to TPMI indexes from small to large) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |

TABLE 1-continued

| TPMI index | Precoding matrix W (from left to right, respectively corresponding to TPMI indexes from small to large) |
|---|---|
| 16-23 | $-\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $-\frac{1}{2}\begin{bmatrix}1\\-j\\-j\\-1\end{bmatrix}$ — — — — |

It can be learned that when the TPMI index indicated by the network device is 0 to 3, only one of the four ports of the terminal device sends a signal, and the other three ports do not send a signal. For example, when the TPMI index is 0, the terminal device sends a signal on only the port 0; when the TPMI is 1, the terminal device sends a signal on only the port 1. When calculated transmit power of the PUSCH exceeds maximum transmit power of a single port indicated by the precoding matrix, the terminal may simultaneously send the PUSCH on a plurality of ports in a diversity sending manner.

The calculated transmit power $P_{PUSCH}$ of the PUSCH is determined according to a protocol formula, and a unit is dBm:

$$P_{PUSCH}=P_{0\_PUSCH}+10\log_{10}(2^{\mu}\cdot M_{RB}^{PUSCH})+\alpha\cdot PL+\Delta_{TF}+f$$

$P_{0\_PUSCH}$ is a static working point of the base station, which is configured by the base station.

$10\log_{10}(2^{\mu}\cdot M_{RB}^{PUSCH})$ reflects impact of PUSCH bandwidth on power.

PL is a downlink path loss, where if a plurality of antennas are used for sending in the uplink, the path loss is a smallest value of downlink path losses of the antennas according to the protocol.

$\alpha$ is a path loss compensation factor.

$\Delta_{TF}$ reflects impact of a PUSCH code rate on transmit power.

$M_{RB}^{PUSCH}$ represents a quantity of PUSCH RBs.

f is a power control adjustment amount introduced by a power control command word.

As shown in Table 2, when the terminal device supports two ports in the uplink, and the network device schedules one layer, if the network device schedules TPMI indexes of 0 and 1, uplink information is sent through only one port of the two ports of the terminal, and uplink information is not sent through the other port. When the calculated transmit power of the PUSCH exceeds the maximum transmit power of the single port indicated by the precoding matrix, the terminal may simultaneously send the PUSCH on the plurality of ports in a diversity sending manner.

In a non-codebook-based uplink transmission manner, the terminal device sends an SRS signal to the network device (such as a base station) by using each uplink port. The network device measures the SRS, calculates a quantity of layers, and selects a PUSCH sending port. The PUSCH sending port selected by the network device is notified to the terminal device by using an SRS resource indicator (SRS resource indicator, SRI). The SRI indicates one or more SRS resources, and the terminal device sends the PUSCH on a port corresponding to the SRS resource indicated by the SRI. When the SRI indicates one SRS resource, the terminal device sends the PUSCH on only one port corresponding to the SRS resource. When the calculated transmit power of the PUSCH exceeds maximum transmit power of a single port corresponding to the SRS resource, the terminal may simultaneously send the PUSCH on a plurality of ports in a diversity sending manner.

To fully utilize transmit power of the uplink port and improve uplink performance, for a single-port channel, such as a PRACH, a PUCCH, a PUSCH scheduled by a DCI format 0_0, or a PUSCH, indicated by the network device by using a TPMI or an SRI, to be sent on a single port, when the calculated transmit power exceeds the maximum transmit power of the single port, the terminal may transmit a same signal on the plurality of ports in a diversity sending manner. The terminal device needs to allocate transmit power of each uplink port for sending a signal.

An uplink power allocation process is described below by using an example in which the terminal device that uses two uplink ports shown in FIG. 2 sends a PUSCH in a codebook-based uplink transmission manner.

First, the terminal device obtains the calculated transmit power of the PUSCH through calculation in a calculation manner (for example, a formula) specified in the protocol and based on an uplink PUSCH scheduling parameter scheduled by the network device and a power control parameter configured by the base station. The uplink PUSCH scheduling parameter may be dynamically configured by the network device. The power control parameter may be configured by the network device in a semi-static manner.

TABLE 2

| TPMI index | codebook W (from left to right, respectively corresponding to TPMI indexes from small to large) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

Optionally, the uplink PUSCH scheduling parameter may include $M_{RB}^{PUSCH}$, f, and $\Delta_{TF}$. The power control parameter may include $P_{O\_PUSCH}$ and $\alpha$.

Further, the terminal device evenly divides, for the uplink ports, the calculated transmit power obtained through calculation, and considers a limitation of maximum transmit power supported by each port.

For example, the network device schedules two layers of transmission. Maximum transmit power of a port 0 (for example, the antenna 1 shown in FIG. 2) and a port 1 (for example, the antenna 2 shown in FIG. 2) of the terminal device are respectively 19 dBm and 22 dBm. It is considered that the port 0 and the port 1 have different impact on human body electromagnetic absorption, power back-off amounts of the port 0 and the port 1 are different, and therefore the maximum transmit power are also different. In other words, when the port 0 uses the transmit power of 19 dBm, and the port 1 uses the transmit power of 22 dBm, transmit power of the terminal device reaches the maximum transmit power.

It is assumed that the precoding matrix is $$\frac{1}{\sqrt{2}}\begin{bmatrix} 1 & 0 \\ 0 & 1 \end{bmatrix}.$$

In this case, uplink information needs to be sent through both ports. If the calculated transmit power of the PUSCH is 18 dBm, 15 dBm needs to be used for sending through the two ports separately (or when maximum transmit power supported by the port is not considered, transmit power allocated by the terminal device to both of the two ports is 15 dBm), which is less than the maximum transmit power of both ports. Therefore, the transmit power of both the port 0 and the port 1 is 15 dBm. If the calculated transmit power of the PUSCH is 24 dBm, 21 dBm needs to be used for sending through both ports. 21 dBm is greater than the maximum transmit power of 19 dBm of the port 0, and 21 dBm is less than the maximum transmit power of 22 dBm of the port 1. Therefore, the transmit power of the port 0 and the transmit power of the port 1 are respectively 19 dBm and 21 dBm. If the calculated transmit power of the PUSCH is 27 dBm, 24 dBm needs to be used for sending through both ports. 24 dBm is greater than respective maximum transmit power of the two ports. Therefore, the transmit power of the port 0 and the transmit power of the port 1 are respectively 19 dBm and 22 dBm.

In addition, if the network device schedules one layer of transmission, the precoding matrix is $$\frac{1}{2}\begin{bmatrix} 1 \\ 0 \end{bmatrix},$$

and sending is performed through the port 0 and the port 1 in a diversity manner. It is assumed that the calculated transmit power of the PUSCH is 23 dBm. In this case, 20 dBm needs to be used for sending through the port 0 and the port 1 separately. If the maximum transmit power of the port 1 and the maximum transmit power of the port 2 are respectively 19 dBm and 22 dBm, the transmit power of the port 0 is 19 dBm and the transmit power of the port 1 is 20 dBm.

The foregoing power allocation manner has the following problems.

When a quantity of PUSCH sending ports indicated by the network device is less than a quantity of uplink ports, uplink transmission performance is reduced in a case in which transmit power allocated in the diversity sending manner exceeds the maximum transmit power supported by the port.

For example, in the foregoing example, the network device schedules one layer of transmission, the precoding matrix is $$\frac{1}{2}\begin{bmatrix} 1 \\ 0 \end{bmatrix},$$

the transmit power on the port 1 determined in the diversity allocation manner is 19 dBm, and the transmit power on the port 2 is 20 dBm. Uplink transmit power of the port 1 does not reach 20 dBm. Therefore, uplink transmit power of the terminal device does not reach calculated transmit power of 23 dBm. In addition, the transmit power on the port 2 does not reach the maximum transmit power, that is, 22 dBm.

Figure 4:
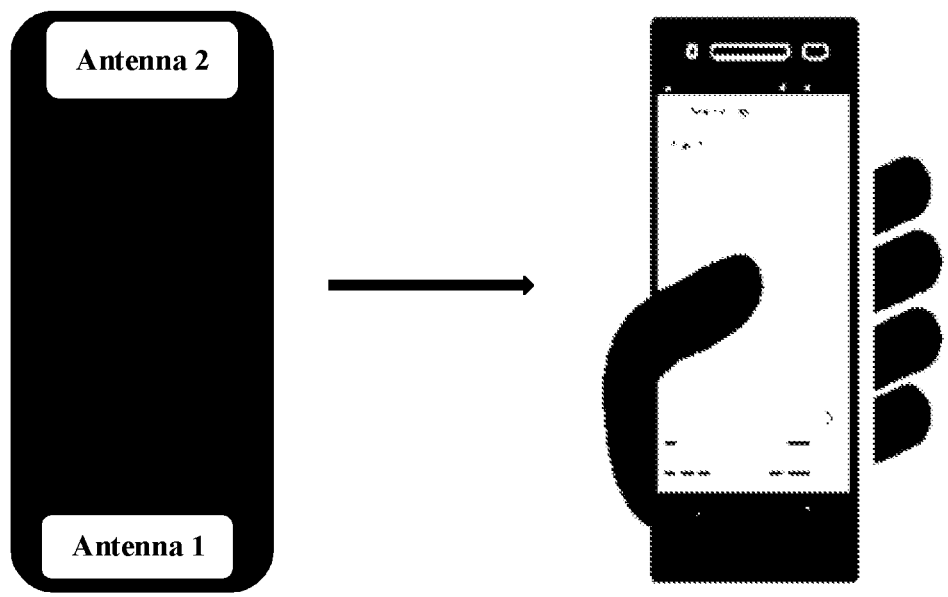
FIG. 4 is a schematic diagram of holding a terminal device by hand according to an embodiment of this application.

In addition, different antennas of a same terminal may be disposed at different locations of the terminal device. As shown in FIG. 4, a mobile phone is used as an example. When a user holds the mobile phone by hand, a signal of an antenna 1 of the mobile phone is blocked. Consequently, signal attenuation is large. Therefore, attenuation of an uplink channel of the antenna 1 is greater than that of an uplink channel of an antenna 2 that is not held by the hand, that is, a path loss of the antenna 1 is greater. Because a path loss of each port is not considered in the foregoing diversity sending manner, the uplink performance is reduced when path losses between ports are different.

For another uplink channel sent by a single port, such as a physical uplink control channel (physical uplink control channel, PUCCH), a physical random access channel (physical random access channel, PRACH), a PUSCH scheduled by a DCI format 0_0, or a PUSCH, indicated by the network device by using an SRI, to be sent on a single port, the terminal may also use the diversity sending manner. If the calculated transmit power is evenly divided for the uplink ports, the same problem as that of the PUSCH sending is also present. Consequently, the uplink transmission performance is reduced.

To optimize an existing transmit power allocation solution, an embodiment of this application provides a power configuration method. In the method, a terminal device may determine a first port from a plurality of uplink ports based on first information, and the terminal device preferentially performs uplink sending by using the first port. It may be understood that the method may be applied to the scenario shown in FIG. 1 or FIG. 3. In addition, the method may be implemented by the terminal device shown in FIG. 2.

Figure 5A:
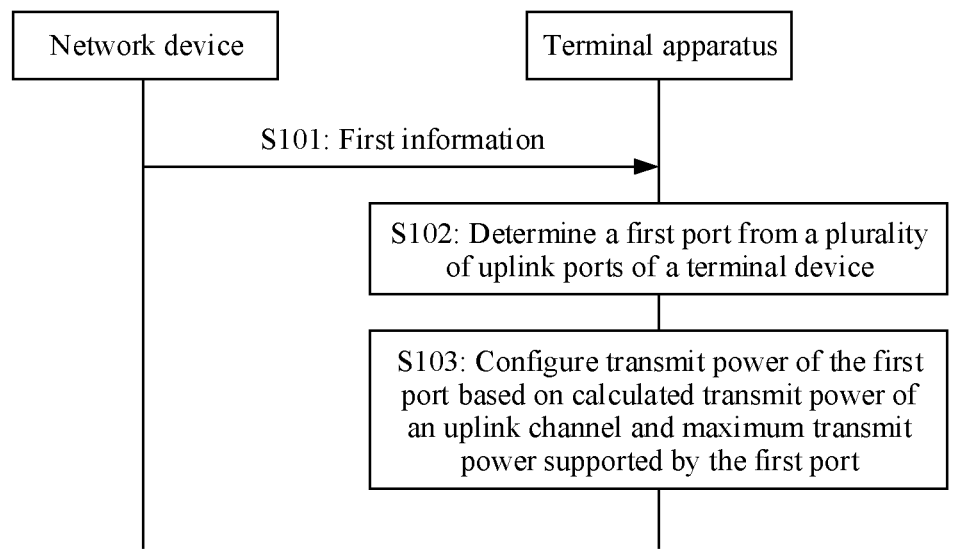
FIG. 5A is a schematic flowchart of a communications method according to an embodiment of this application.
Figure 5B:
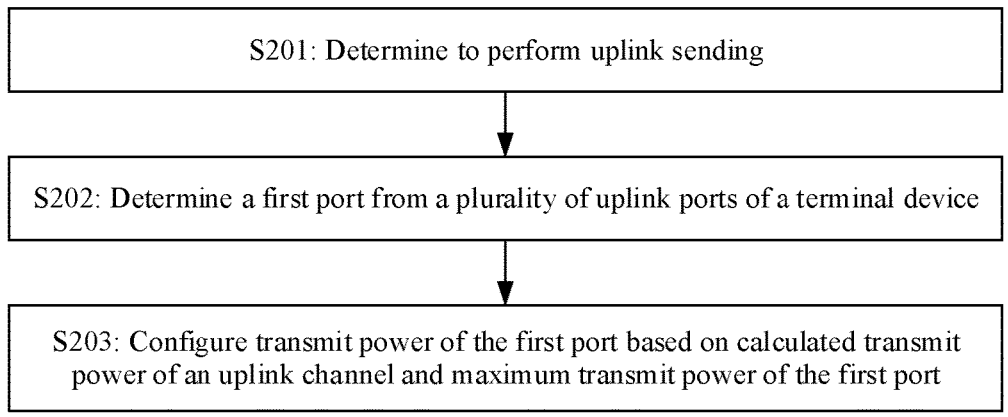
FIG. 5B is a schematic flowchart of another communications method according to an embodiment of this application.

As shown in FIG. 5B, an example in which an implementation body is a terminal device is used. When a PRACH or a PUCCH is sent, the method may include the following steps.

S201: The terminal device determines to perform uplink sending.

The uplink sending herein refers to PRACH sending or PUCCH sending. If the terminal determines to perform PRACH sending, an uplink channel includes a PRACH. If the terminal determines to perform PUCCH sending, an uplink channel includes a PUCCH.

Optionally, when the terminal initiates a random access procedure, the terminal determines to send a preamble on the PRACH. In other words, the terminal determines to perform PRACH sending.

Optionally, when the terminal needs to send UCI, and the UCI cannot be reused for sending on the PUSCH, the terminal determines to send the UCI on the PUCCH. In other words, the terminal determines to perform PUCCH sending.

S202: The terminal device determines a first port from a plurality of uplink ports of the terminal device.

In a possible example, the first port is an uplink port that has a smaller (or a smallest) uplink path loss and that is determined by the terminal device. Herein, the terminal device may consider by default that an uplink channel and a downlink channel of each uplink port supporting uplink and downlink communication are reciprocal. Therefore, a downlink path loss of each uplink port may be used as an uplink path loss of the uplink port, to determine an uplink port with a smaller (or smallest) uplink path loss. In this case, it may be considered that the first information includes downlink path loss information of each uplink port, and the terminal device determines the first port based on the first information.

For example, uplink ports of the terminal device include a port 0 and a port 1. If determining that a downlink path loss of the port 0 is less than a downlink path loss of the port 1, the terminal device may determine the port 0 as the first port. Alternatively, when a downlink path loss of the port 0 and that of the port 1 are the same, the terminal device may use any one of the port 0 and the port 1 as the first port, for example, select a port with larger (or largest) maximum transmit power as the first port.

For another example, uplink ports of the terminal device include four uplink ports, and the terminal device may use a port with a smallest downlink path loss as the first port. In a possible example, the first port is an uplink port that has a larger (or largest) uplink received signal strength indicator (Received Signal Strength Indicator, RSSI) and that is determined by the terminal device. Herein, the terminal device may consider by default that an uplink channel and a downlink channel of each uplink port supporting uplink and downlink communication are reciprocal. Therefore, a downlink RSSI of each uplink port may be used as an uplink RSSI of the uplink port, to determine an uplink port with a larger (or largest) uplink RSSI. In this case, it may be considered that the first information includes downlink RSSI information of each uplink port, and the terminal device determines the first port based on the first information.

For example, uplink ports of the terminal device include a port 0 and a port 1. If determining that a downlink RSSI of the port 0 is greater than a downlink RSSI of the port 1, the terminal device may determine the port 0 as the first port. Alternatively, when a downlink RSSI of the port 0 and that of the port 1 are the same, the terminal device may use any one of the port 0 and the port 1 as the first port, for example, select a port with larger (or largest) maximum transmit power as the first port.

In a possible example, the first port is an uplink port that has larger (or largest) uplink reference signal received power (Reference Signal Received Power, RSRP) and that is determined by the terminal device. Herein, the terminal device may consider by default that an uplink channel and a downlink channel of each uplink port supporting uplink and downlink communication are reciprocal. Therefore, downlink RSRP of each uplink port may be used as uplink RSRP of the uplink port, to determine an uplink port with larger (or largest) uplink RSRP. In this case, it may be considered that the first information includes downlink RSRP information of each uplink port, and the terminal device determines the first port based on the first information.

For example, uplink ports of the terminal device include a port 0 and a port 1. If determining that downlink RSRP of the port 0 is greater than downlink RSRP of the port 1, the terminal device may determine the port 0 as the first port. Alternatively, when downlink RSRP of the port 0 and that of the port 1 are the same, the terminal device may use any one of the port 0 and the port 1 as the first port, for example, select a port with larger (or largest) maximum transmit power as the first port.

For another example, uplink ports of the terminal device include four uplink ports, and the terminal device may use a port with largest downlink RSRP as the first port.

In a possible example, the first port is an uplink port that has a larger (or largest) uplink signal-to-noise ratio (Signal-to-Noise Ratio, SNR) or signal-to-interference plus noise ratio (Signal-to-Interference plus Noise Ratio, SINR) and that is determined by the terminal device. Herein, the terminal device may consider by default that an uplink channel and a downlink channel of each uplink port supporting uplink and downlink communication are reciprocal. Therefore, a downlink SNR/SINR of each uplink port may be used as an uplink SNR/SINR of the uplink port, to determine an uplink port with a larger (largest) uplink SNR/SINR. In this case, it may be considered that the first information includes downlink SNR/SINR information of each uplink port, and the terminal device determines the first port based on the first information.

For example, uplink ports of the terminal device include a port 0 and a port 1. If determining that a downlink SNR/SINR of the port 0 is greater than a downlink SNR/SINR of the port 1, the terminal device may determine the port 0 as the first port. Alternatively, when a downlink SNR/SINR of the port 0 and that of the port 1 are the same, the terminal device may use any one of the port 0 and the port 1 as the first port, for example, select a port with larger (or largest) maximum transmit power as the first port.

For another example, uplink ports of the terminal device include four uplink ports, and the terminal device may use a port with a largest downlink SNR/SINR as the first port.

S203: The terminal device configures transmit power of the first port based on calculated transmit power of the uplink channel and maximum transmit power of the first port. In other words, the terminal device configures the calculated transmit power of the uplink channel or the maximum transmit power of the first port as the transmit power of the first port.

The uplink channel is a PRACH or a PUCCH, and the calculated transmit power of the uplink channel is calculated transmit power $P_{PRACH}$ of the PRACH or calculated transmit power $P_{PUCCH}$ of the PUCCH.

For example, if the port 0 (or referred to as the first port) is the first port, the terminal device may configure the port 0 to send uplink information by using the calculated transmit power of the PRACH or the PUCCH or the maximum transmit power that can be supported by the port 0.

In addition, the terminal device may configure, based on the configured transmit power of the first port and the calculated transmit power, transmit power of other uplink ports than the first port. For example, in the foregoing example, if the calculated transmit power of the PRACH or the PUCCH is greater than the maximum transmit power that can be supported by the port 0, the terminal device may further configure transmit power of another port based on the calculated transmit power of the PRACH or the PUCCH and the uplink transmit power configured for the port 0 after configuring the uplink transmit power of the port 0.

Subsequently, the terminal device may perform uplink sending by using the first port (or by using the first port and another uplink port).

In the foregoing manner, the terminal device may use a diversity sending manner when sending the PRACH or the PUCCH, and allocate more transmit power to a port with a smaller (or smallest) path loss, a larger (or largest) RSSI, larger (or largest) RSRP, or a larger (or largest) SNR/SINR, so that receive power or an SNR/SINR used when the network device receives uplink information is maximized, thereby optimizing a transmit power allocation solution and improving uplink performance.

As shown in FIG. 5A, an example in which an implementation body is a terminal device is used. When a PUSCH is sent, the method may include the following steps.

S101: The terminal device receives uplink scheduling information from a network device.

The uplink scheduling information may be included in a DCI format 0_0, and instructs the terminal to send single-stream data on a single port.

Alternatively, the uplink scheduling information may be included in a DCI format 0_1, and may be used to indicate a precoding matrix and a quantity of MIMO layers. The precoding matrix indicates that the PUSCH is sent on only one port. In implementation, the uplink scheduling information includes indication information used to indicate a precoding matrix and indication information used to indicate a quantity of MIMO layers, which are respectively used to indicate the precoding matrix and the quantity of MIMO layers. The precoding matrix is, for example, a precoding matrix corresponding to one of TPMI indexes 0 to 3 shown in Table 1.

Alternatively, the uplink scheduling information may be included in a DCI format 0_1, and may be used to indicate one or more SRS resources. The uplink scheduling information indicates only one SRS resource, and the terminal device sends the PUSCH on only one port corresponding to the SRS resource. In implementation, the uplink scheduling information includes an SRI, and the SRI indicates one SRS resource.

S102: The terminal device determines a first port from a plurality of uplink ports of the terminal device.

In a possible example, the first port is an uplink port that has a smaller (or a smallest) uplink path loss and that is determined by the terminal device. Herein, the terminal device may consider by default that an uplink channel and a downlink channel of each uplink port supporting uplink and downlink communication are reciprocal, and may use a downlink path loss of each uplink port as an uplink path loss of the uplink port, to determine an uplink port with a smaller (or smallest) uplink path loss. In this case, it may be considered that the first information includes downlink path loss information (and/or uplink path loss information, which are/is briefly referred to as path loss information) of each uplink port, and the terminal device determines the first port based on the first information.

For example, uplink ports of the terminal device include a port 0 and a port 1. If determining that a downlink path loss of the port 0 is less than a downlink path loss of the port 1, the terminal device may determine the port 0 as the first port. Alternatively, when a downlink path loss of the port 0 and that of the port 1 are the same, the terminal device may use any one of the port 0 and the port 1 as the first port, for example, select a port with larger (or largest) maximum transmit power as the first port.

In a possible example, the first port is an uplink port that has a larger (or largest) uplink RSSI and that is determined by the terminal device. Herein, the terminal device may consider by default that an uplink channel and a downlink channel of each uplink port supporting uplink and downlink communication are reciprocal. Therefore, a downlink RSSI of each uplink port may be used as an uplink RSSI of the uplink port, to determine an uplink port with a larger (or largest) uplink RSSI. In this case, it may be considered that the first information includes downlink RSSI information of each uplink port, and the terminal device determines the first port based on the first information. In this application, the uplink RSSI and/or the downlink RSSI may be referred to as an RSSI.

For example, uplink ports of the terminal device include a port 0 and a port 1. If determining that a downlink RSSI of the port 0 is greater than a downlink RSSI of the port 1, the terminal device may determine the port 0 as the first port. Alternatively, when a downlink RSSI of the port 0 and that of the port 1 are the same, the terminal device may use any one of the port 0 and the port 1 as the first port, for example, select a port with larger (or largest) maximum transmit power as the first port.

In a possible example, the first port is an uplink port that has larger (or largest) uplink RSRP and that is determined by the terminal device. Herein, the terminal device may consider by default that an uplink channel and a downlink channel of each uplink port supporting uplink and downlink communication are reciprocal. Therefore, downlink RSRP of each uplink port may be used as uplink RSRP of the uplink port, to determine an uplink port with larger (or largest) uplink RSRP. In this case, it may be considered that the first information includes downlink RSRP information of each uplink port, and the terminal device determines the first port based on the first information. In this application, the uplink RSRP and/or the downlink RSRP may be referred to as RSRP.

For example, uplink ports of the terminal device include a port 0 and a port 1. If determining that downlink RSRP of the port 0 is greater than downlink RSRP of the port 1, the terminal device may determine the port 0 as the first port. Alternatively, when downlink RSRP of the port 0 and that of the port 1 are the same, the terminal device may use any one of the port 0 and the port 1 as the first port, for example, select a port with larger (or largest) maximum transmit power as the first port.

In a possible example, the first port is an uplink port that has a larger (or largest) uplink SNR or SINR and that is determined by the terminal device. Herein, the terminal device may consider by default that an uplink channel and a downlink channel of each uplink port supporting uplink and downlink communication are reciprocal. Therefore, a downlink SNR/SINR of each uplink port may be used as an uplink SNR/SINR of the uplink port, to determine an uplink port with a larger (largest) uplink SNR/SINR. In this case, it may be considered that the first information includes downlink SNR/SINR information of each uplink port, and the terminal device determines the first port based on the first information. In this application, the uplink SNR (or uplink SINR) and/or the downlink SNR (or downlink SINR) may be referred to as an SNR (or SINR).

For example, uplink ports of the terminal device include a port 0 and a port 1. If determining that a downlink SNR/SINR of the port 0 is greater than a downlink SNR/SINR of the port 1, the terminal device may determine the port 0 as the first port. Alternatively, when a downlink SNR/SINR of the port 0 and that of the port 1 are the same, the terminal device may use any one of the port 0 and the port 1 as the first port, for example, select a port with larger (or largest) maximum transmit power as the first port.

In another possible example, the first port is an uplink port indicated by the network device.

In this example, the network device may estimate uplink channel quality of each uplink port based on an uplink signal (for example, an SRS). The uplink channel quality includes but is not limited to an uplink path loss, an uplink RSSI, uplink RSRP, and an uplink SNR/SINR. Therefore, an uplink port with a smaller (or smallest) uplink path loss, a larger (or largest) uplink RSSI, larger (or largest) uplink RSRP, or a larger (or largest) uplink SNR/SINR may be indicated as the first port by using the uplink scheduling information and the indication information of the precoding matrix. Alternatively, when an uplink path loss of the port 1 and that of the port 2 are the same, the network device may indicate any one of the port 1 and the port 2 as the first port. In this case, it may be considered that the first information includes the uplink scheduling information or the indication information of the precoding matrix, and the terminal device determines the first port based on the first information. The first information may be used to indicate the first port. In other words, the first information may be used to instruct to perform uplink sending through the first port.

Compared with a solution in which the terminal device determines the first port based on a downlink channel, the network device indicates the first port based on the uplink channel quality obtained through measurement, so that an uplink port with good uplink performance can be more accurately indicated, thereby avoiding an error generated due to poor reciprocity of the uplink channel and the downlink channel when the terminal device determines the first port, but a measurement result may not be adapted because of a change of the uplink channel.

S103: The terminal device configures transmit power of the first port based on calculated transmit power of the uplink channel and maximum transmit power of the first port. In other words, the terminal device configures the calculated transmit power of the uplink channel or the maximum transmit power of the first port as the transmit power of the first port.

The uplink channel herein includes a PUSCH. The calculated transmit power of the uplink channel refers to calculated transmit power of the PUSCH.

For example, if the port 0 (or referred to as the first port) is the first port, the terminal device may configure the port 0 to send uplink information by using the calculated transmit power of the PUSCH or the maximum transmit power that can be supported by the port 0.

In addition, the terminal device may configure, based on the configured transmit power of the first port and the calculated transmit power, transmit power of other uplink ports than the first port. For example, in the foregoing example, if the calculated transmit power of the PUSCH is greater than the maximum transmit power that can be supported by the port 0, the terminal device may further configure transmit power of another port based on the calculated transmit power of the PUSCH and the uplink transmit power configured for the port 0 after configuring the uplink transmit power of the port 0.

In the foregoing manner, the terminal device may use a diversity sending manner when the network instructs, by using a DCI format 0_0, the terminal to send single-stream data on a single port, and allocate more transmit power to a port with a smaller (or smallest) path loss, a larger (or largest) RSSI, larger (or largest) RSRP, or a larger (or largest) SNR/SINR, so that receive power or an SNR/SINR used when the network device receives uplink information is maximized, thereby optimizing a transmit power allocation solution and improving uplink performance.

Alternatively, the terminal device may use a diversity sending manner when the network device instructs, by using a precoding matrix or an SRI, the terminal to send the PUSCH on a single port, and allocate more transmit power to an uplink port with a smaller (or smallest) path loss, a larger (or largest) RSSI, larger (or largest) RSRP, or a larger (or largest) SNR/SINR, or indicated by the network device, so that receive power or an SNR/SINR used when the network device receives uplink information is maximized, thereby optimizing a transmit power allocation solution and improving uplink performance.

The foregoing method is also applicable to sending by the network device by using a PUSCH not dynamically scheduled by DCI, for example, sending by using a semi-static PUSCH configured by the network device.

The following specifically describes, based on different cases, a manner in which the terminal device configures transmit power of the first port. It should be understood that the first port herein may be used to send a PRACH, a PUCCH, or a PUSCH on an uplink channel. In other words, the following description may be applied to the scenario shown in FIG. 5A and/or FIG. 5B. The uplink channel herein includes a PRACH, a PUCCH, or a PUSCH.

Manner 1: When the calculated transmit power of the uplink channel is less than or equal to the maximum transmit power of the first port, the calculated transmit power of the uplink channel is configured as the transmit power of the first port.

In the step shown in S103, if the calculated transmit power of the uplink channel of the terminal device is less than (or less than or equal to) the maximum transmit power of the first port, the terminal device may configure the calculated transmit power as the transmit power of the first port. In this case, transmit power of another uplink port of the terminal device may be configured to 0. Therefore, the terminal device sends the uplink channel through only the first port.

A possible example includes: If the first port is a port i, the calculated transmit power (represented as $P_{CH}$) of the uplink channel of the terminal device is less than or equal to the maximum transmit power (represented as $P_{max,i}$) of the first port, and the terminal device configures the transmit power of the first port to $P_{CH}$.

When the uplink channel is the PRACH, $P_{CH}$ is $P_{PRACH}$; when the uplink channel is the PUCCH, $P_{CH}$ is $P_{PUCCH}$; or when the uplink channel is the PUSCH, $P_{CH}$ is $P_{PUSCH}$.

Optionally, in this manner, the terminal device may configure transmit power of other uplink ports than the first port to 0. In other words, in this case, the terminal device performs uplink channel sending by using only the first port.

Manner 2: When the calculated transmit power of the uplink channel is greater than the maximum transmit power of the first port, the maximum transmit power of the first port is configured as the transmit power of the first port.

In the step shown in S103, if the calculated transmit power of the uplink channel of the terminal device is greater than the maximum transmit power of the first port, the terminal device may configure the calculated transmit power as the transmit power of the first port.

A possible example includes: If the first port is a port i, the calculated transmit power (represented by $P_{CH}$) of the uplink channel of the terminal device is greater than the maximum transmit power (represented by $P_{max,i}$) of the first port, and the terminal device configures the transmit power of the first port to $P_{max,i}$. If the other uplink port of the terminal device is an uplink port j, the terminal device may configure transmit power of the port j to $\min\{P_{max,i}, 10 \log (\hat{P}_{CH}-\hat{P}_{max,i})\}$, where $\hat{P}_{CH}$ represents a linear value of $P_{CH}$, $\hat{P}_{max,i}$ represents a linear value of $P_{max,i}$, $P_{max,j}$ represents maximum transmit power of the port j, $P_{CH}=10 \log_{10} \hat{P}_{CH}$, $P_{max,i}=10 \log_{10} P_{max,i}$, and min {a, b} represents a largest value of a and b.

That is, in Manner 2, the terminal device may preferentially allocate the calculated transmit power of the uplink channel to the first port, and deliver the remaining power to the other uplink port.

Manner 3: When the calculated transmit power of the uplink channel is greater than the maximum transmit power of the first port, the calculated transmit power of the uplink channel is evenly divided for a plurality of uplink ports including the first port.

Two uplink ports are used as an example. In the step shown in S103, if the calculated transmit power (represented as $P_{CH}$) of the uplink channel of the terminal device is greater than the maximum transmit power (represented as $P_{max,i}$) of the first port (for example, the port i), the terminal device may configure the transmit power of the first port to min $\{P_{max,i}, P_{CH}-3\}$. Optionally, the other uplink of the terminal device is a port j, and the terminal device may configure transmit power of the port j to min $\{P_{max,j}, P_{CH}-3\}$.

Manner 4: When the calculated transmit power of the uplink channel is greater than the maximum transmit power of the first port, the terminal device determines whether the first port and a second port meet a specific condition, and determines the transmit power of the first port based on a determining result.

For example, if determining that the first port and the second port meet a specific condition, the terminal device may specify the transmit power of the first port to $P_{max,i}$, and the transmit power of the uplink port j may be configured to $\min\{P_{max,i}, 10 \log(\hat{P}_{CH}-\hat{P}_{max,i})\}$, where $\hat{P}_{CH}$ represents a linear value of $P_{CH}$, $\hat{P}_{max,i}$ represents a linear value of $P_{max,i}$, $P_{max,j}$ represents maximum transmit power of the port j, $P_{CH}=10 \log_{10} \hat{P}_{CH}$, $P_{max,i}=10 \log_{10} \hat{P}_{max,i}$, and min{a, b} represents that a smallest value of a and b is used.

Otherwise, if the specific condition is not met, the transmit power of the first port may be allocated in Manner 3, that is, $P_{CH}$ is evenly divided for the first port and the other uplink port.

The following describes a setting manner of the specific condition by using an example.

If the first information includes an SNR, the first port and the second port may be determined based on respective SNRs of the ports. In this case, the specific condition herein is, for example, that the SNR of the first port is greater than (or not less than) the SNR of the second port, where a specified value is greater than 0. In other words, the specific condition may be represented as $SNR_1 - SNR_2 > SNR_{Threshold}$, where $SNR_1$ and $SNR_2$ are respectively the SNR of the first port and that of the second port, and the $SNR_{Threshold}$ is the specified value. If the first port is a port with a largest SNR, the terminal device may select, from a plurality of ports of the terminal device, a port with a second largest SNR as the second port. Alternatively, the terminal device may select, from one or more ports other than the first port of the terminal device, a port with a largest SNR as the second port.

If the first information includes an uplink path loss (or a downlink path loss), the first port and the second port may be determined based on the uplink path loss. In this case, the specific condition herein is, for example, that a difference between a path loss of the second port and a path loss of the first port is greater than (or not less than) a specified value, the path loss of the second port is greater than the path loss of the first port, and the specified value is greater than 0. The specific condition may be represented as $PL_j - PL_i > PL_{Threshold}$, where $PL_j$ represents an uplink path loss of the second port, $PL_i$ represents an uplink path loss of the first port, and $PL_{Threshold}$ is the specified value. For example, a value of $PL_{Threshold}$ is 2 dBm. Alternatively, the specific condition herein is, for example, $PL_j/PL_i > PL_{Threshold}$, where a value of $PL_{Threshold}$ is greater than 1. If the first port is a port with a smallest uplink path loss, the terminal device may select, from a plurality of ports of the terminal device, a port with a second smallest uplink path loss as the second port. Alternatively, the terminal device may select, from one or more ports other than the first port, a port with a largest SNR as the second port.

If the first information includes an RSSI, the first port and the second port may be determined based on respective RSSIs of the ports. In this case, the specific condition herein is, for example, that the RSSI of the first port is greater than (or not less than) the RSSI of the second port, where the specified value is greater than 0. In other words, the specific condition may be represented as $RSSI_1 - RSSI_2 > RSSI_{Threshold}$, where $RSSI_1$ and $RSSI_2$ are respectively the RSSI of the first port and that of the second port, and $RSSI_{Threshold}$ is the specified value. If the first port is a port with a largest RSSI, the terminal device may select, from a plurality of ports of the terminal device, a port with a second largest RSSI as the second port. Alternatively, the terminal device may select, from one or more ports other than the first port, a port with a largest RSSI as the second port.

If the first information includes RSRP, the first port and the second port may be determined based on respective RSRP of the ports. In this case, the specific condition herein is, for example, that the RSRP of the first port is greater than (or not less than) the RSRP of the second port, where the specified value is greater than 0. In other words, the specific condition may be represented as $RSRP_1 - RSRP_2 > RSRP_{Threshold}$, where $RSRP_1$ and $RSRP_2$ are respectively the RSRP of the first port and that of the second port, and $RSRP_{Threshold}$ is the specified value. If the first port is a port with largest RSRP, the terminal device may select, from a plurality of ports of the terminal device, a port with second largest RSRP as the second port. Alternatively, the terminal device may select, from one or more ports other than the first port, a port with largest RSRP as the second port.

If the first information includes RSCP, the first port and the second port may be determined based on respective RSCP of the ports. In this case, the specific condition herein is, for example, that the RSCP of the first port is greater than (or not less than) the RSCP of the second port, where the specified value is greater than 0. In other words, the specific condition may be represented as $RSCP_1 - RSCP_2 > RSCP_{Threshold}$, where $RSCP_1$ and $RSCP_2$ are respectively the RSCP of the first port and that of the second port, and $RSCP_{Threshold}$ is the specified value. If the first port is a port with largest RSCP, the terminal device may select, from a plurality of ports of the terminal device, a port with second largest RSCP as the second port. Alternatively, the terminal device may select, from one or more ports other than the first port, a port with largest RSCP as the second port.

Optionally, if the first port and the second port do not meet the specific condition, the terminal device may evenly divide the calculated transmit power of the uplink channel for the plurality of uplink ports including the first port. Optionally, for example, the uplink port includes the first port (the port i) and the port j, the terminal device may specify transmit power of the first port to min $\{P_{max,i}, P_{CH}-3\}$, and the terminal device may specify transmit power of the port j to min $\{P_{max,j}, P_{CH}-3\}$.

For example, the first information includes an uplink path loss. If an uplink path loss of the first port is less than an uplink path loss of another uplink port of the terminal device, and a difference between the uplink path loss of the first port and an uplink path loss other than a second smallest one (for example, an uplink path loss of the port j) is less than the specified value, the terminal device may evenly divide the calculated transmit power of the uplink channel for the plurality of uplink ports including the first port. For example, the uplink port includes the first port (the port i) and the port j. The terminal device may specify transmit power of the first port to min $\{P_{max,i}, P_{CH}-3\}$. Optionally, the terminal device may configure transmit power of the port j to min $\{P_{max,i}, P_{CH}-3\}$.

The following describes the power configuration method provided in the embodiments of this application with reference to specific scenarios.

Scenario 1

To more properly allocate transmit power of uplink ports, the terminal device may estimate uplink path losses of the uplink ports based on downlink path losses of the uplink ports, and select an uplink port with a small uplink path loss as the first port. An example is as follows.

An example in which the terminal device supports uplink sending by using two ports is used. The uplink ports of the terminal device include a port $p_1$ and a port $p_2$, uplink path losses thereof are respectively $PL_1$ and $PL_2$, maximum transmit power of the port $p_1$ and maximum transmit power of the port $p_2$ are respectively $P_{max,1}$ and $P_{max,2}$, and linear values are $\hat{P}_{max,1}$ and $\hat{P}_{max,2}$. $PL_1$ and $PL_2$ are respectively obtained through estimation based on a downlink path loss of the port $p_1$ and that of the port $p_2$.

It is assumed that a precoding matrix indicated by the network device belongs to a non-coherent codebook, and a quantity of layers is less than a quantity of ports. The terminal device may select, from the port $p_1$ and the port $p_2$, a first port with a small uplink path loss based on the uplink path loss of the port $p_1$ and that of the port $p_2$, and allocate more transmit power to the first port as much as possible. $PL_1$ and $PL_2$ are respectively estimated based on the downlink path loss of the port $p_1$ and that of the port $p_2$.

Figure 6:
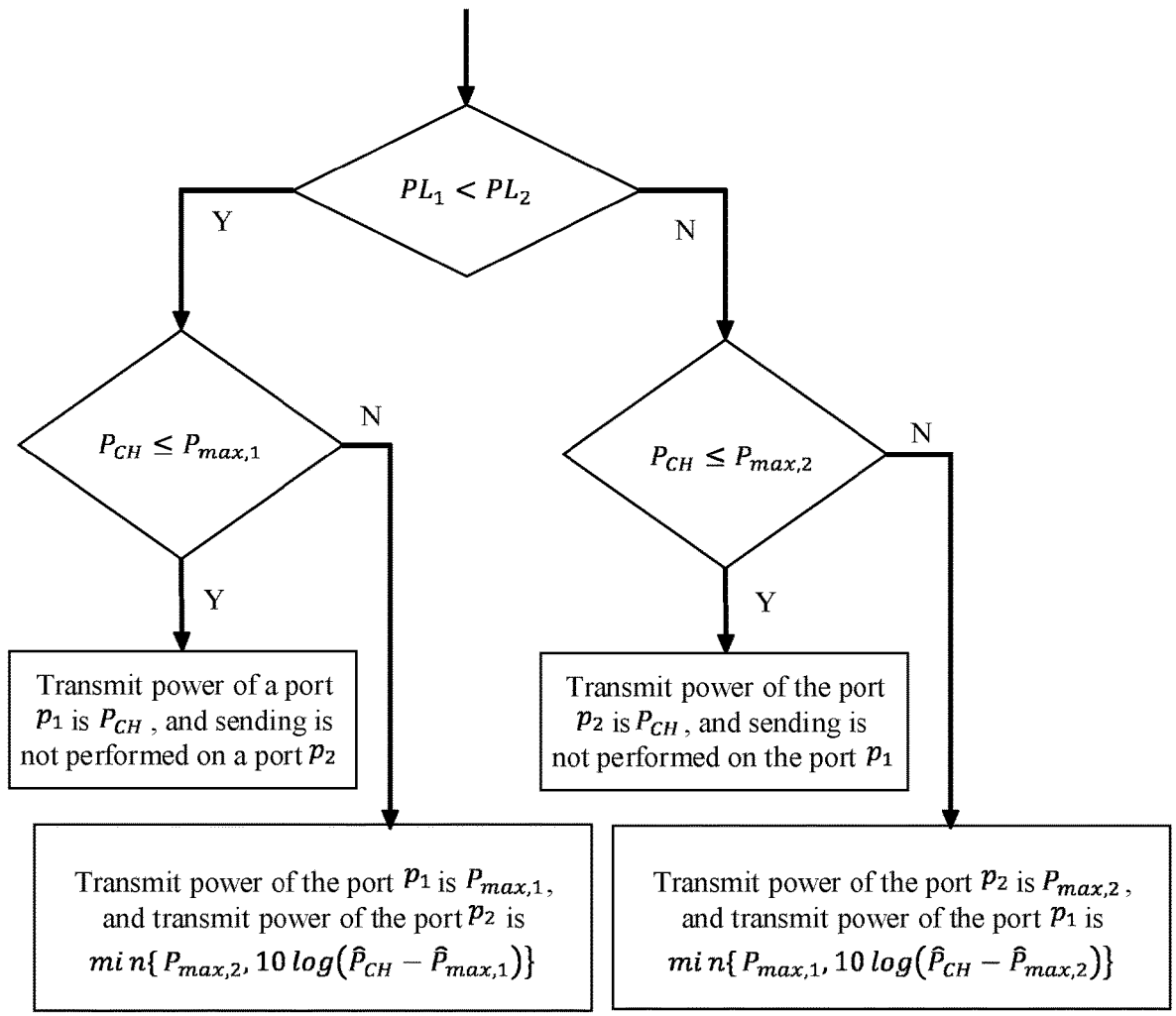
FIG. 6 is a schematic flowchart of another communications method according to an embodiment of this application.

FIG. 6 is a schematic logical diagram of determining the first port and allocating power by the terminal device.

It can be learned that when $PL_1 < PL_2$, the first port is the port $p_1$.

When $P_{CH} \leq P_{max,i}$, the terminal device may configure transmit power of the port $p_1$ to $P_{CH}$, and sending is not performed on the port $p_2$ (in other words, transmit power of the port $p_2$ is 0). $P_{CH}$ represents calculated transmit power of an uplink channel. The uplink channel herein includes a PRACH, a PUCCH, or a PUSCH.

Otherwise, when $P_{CH} > P_{max,i}$, the terminal device may configure transmit power of the port $p_1$ to $P_{max,1}$, and transmit power of the port $p_2$ to $\min\{P_{max,2}, 10 \log(\hat{P}_{CH} - \hat{P}_{max,1})\}$. $\hat{P}_{CH}$ represents a linear value of $P_{CH}$.

When $PL_2 \leq PL_1$, the first port is the port $p_2$.

When $P_{CH} \leq P_{max,2}$, the terminal device may configure transmit power of the port $p_2$ to $P_{CH}$, and sending is not performed on the port $p_1$ (in other words, transmit power of the port $p_1$ is 0). $P_{CH}$ represents calculated transmit power of an uplink channel.

Otherwise, when $P_{PUSCH} > P_{max,2}$, the terminal device may configure transmit power of the port $p_2$ to $P_{max,2}$, and transmit power of the port $p_1$ to $\min\{P_{max,1}, 10 \log(\hat{P}_{CH} - \hat{P}_{max,2})\}$. $\hat{P}_{CH}$ represents a linear value of $P_{CH}$.

Based on the foregoing method, in Scenario 1, the terminal device may determine the first port with a small uplink path loss based on respective uplink path losses of the ports $p_1$ and $p_2$, and allocate as much power to the first port as possible, to maximize receive power of the network device and improve uplink performance.

The following describes, by using Table 3, improvement of the power configuration method provided in this application in Scenario 1 on a power allocation manner in a diversity sending method in the conventional technology. Table 3 uses uplink sending on two ports as an example to show equivalent power $P_{\textit{eff}}$ received by the network device separately according to the power allocation manner in diversity sending in the conventional technology and according to the power configuration method provided in this application in cases of different $P_{CH}$ and different path loss relationships between $p_i$ and $p_j$. $P_{\textit{eff}}$ is a dB value of $\hat{P}_{\textit{eff}}$, that is, $P_{\textit{eff}} = 10 \log_{10} \hat{P}_{\textit{eff}}$.

The following formula is satisfied:

$$\hat{P}_{\textit{eff}} = \alpha \cdot \hat{P}_i + \hat{P}_j$$

$P_i$ and $P_j$ respectively represent transmit power of $p_i$ and transmit power of $p_j$ that are configured by the terminal device, $\hat{P}_i$ and $\hat{P}_j$ respectively represent a linear value of $P_i$ and a linear value of $P_j$, and a channel gain ratio of the port $p_i$ to the port $p_j$ is $\alpha$: 1.

In addition, in Table 3, $PL_j$ represents an uplink path loss of the port j, and $PL_i$ represents an uplink path loss of the port i.

TABLE 3

| | | | | | Power allocation during diversity sending in the conventional technology | | | Power allocation solution provided in the embodiments of this application | | |
|---|---|---|---|---|---|---|---|---|---|---|
| index | $P_{CH}$ | $P_{max,i}$ | $P_{max,j}$ | $PL_j - PL_i$ | $P_i$ | $p_j$ | $P_{\textit{eff}}$ | $P_i$ | $p_j$ | $P_{\textit{eff}}$ |
| 0 | 21 | 20 | 20 | 0 | 17.989 | 17.989 | 21 | 20 | 14.131 | 21 |
| 1 | 21 | 20 | 19 | 0 | 17.989 | 17.989 | 21 | 20 | 14.131 | 21 |
| 2 | 21 | 20 | 17 | 0 | 17.989 | 17 | 20.533 | 20 | 14.131 | 21 |
| 3 | 22 | 20 | 20 | 0 | 18.989 | 18.989 | 22 | 20 | 17.670 | 22 |
| 4 | 22 | 20 | 19 | 0 | 18.989 | 18.989 | 22 | 20 | 17.670 | 22 |
| 5 | 22 | 20 | 17 | 0 | 18.989 | 17 | 21.118 | 20 | 17 | 21.764 |
| 6 | 21 | 20 | 20 | 3 | 17.989 | 17.989 | 19.754 | 20 | 14.131 | 20.529 |
| 7 | 21 | 20 | 19 | 3 | 17.989 | 17.989 | 19.754 | 20 | 14.131 | 20.529 |
| 8 | 21 | 20 | 17 | 3 | 17.989 | 17 | 19.448 | 20 | 14.131 | 20.529 |

TABLE 3-continued

| | | | | | Power allocation during diversity sending in the conventional technology | | | Power allocation solution provided in the embodiments of this application | | |
|---|---|---|---|---|---|---|---|---|---|---|
| index | $P_{CH}$ | $P_{max,i}$ | $P_{max,j}$ | $PL_j - PL_i$ | $P_i$ | $p_j$ | $P_{\mathit{eff}}$ | $P_i$ | $p_j$ | $P_{\mathit{eff}}$ |
| 9 | 22 | 20 | 20 | 3 | 18.989 | 18.989 | 20.754 | 20 | 17.670 | 21.116 |
| 10 | 22 | 20 | 19 | 3 | 18.989 | 18.989 | 20.754 | 20 | 17.670 | 21.116 |
| 11 | 22 | 20 | 17 | 3 | 18.989 | 17 | 20.185 | 20 | 17 | 20.973 |
| 12 | 21 | 20 | 20 | 6 | 17.989 | 17.989 | 18.962 | 20 | 14.131 | 20.273 |
| 13 | 21 | 20 | 19 | 6 | 17.989 | 17.989 | 18.962 | 20 | 14.131 | 20.273 |
| 14 | 21 | 20 | 17 | 6 | 17.989 | 17 | 18.781 | 20 | 14.131 | 20.273 |
| 15 | 22 | 20 | 20 | 6 | 18.989 | 18.989 | 19.962 | 20 | 17.670 | 20.595 |
| 16 | 22 | 20 | 19 | 6 | 18.989 | 18.989 | 19.962 | 20 | 17.670 | 20.595 |
| 17 | 22 | 20 | 17 | 6 | 18.989 | 17 | 19.630 | 20 | 17 | 20.514 |

It can be learned that in various cases shown in Table 3, in the manners shown in the embodiments of this application, $P_{\mathit{eff}}$ in network device embodiments are all greater than or equal to $P_{\mathit{eff}}$ in the conventional technology 2. Therefore, receive power of the network device can be improved, thereby improving uplink performance.

For example, in a case shown by an index 2 in Table 7, when path losses of $p_i$ and $p_j$ are the same, the transmit power allocation solution provided in this application enables the terminal device to allocate transmit power to the port $p_i$ with large maximum transmit power as much as possible, and obtained $P_{\mathit{eff}}$ is 21 dBm. By comparison, in the diversity sending solution in the conventional technology, $P_{\mathit{eff}}$ obtained in a solution in which transmit power is evenly allocated to $p_i$ and $p_j$ is only 20.533. Therefore, the power configuration method shown in Scenario 1 can increase $P_{\mathit{eff}}$ received by the network device, and therefore can improve uplink transmission performance.

For another example, in a case shown by an index 7 in Table 7, when path losses of $p_i$ and $p_j$ are different, the transmit power allocation solution provided in this application enables the terminal device to allocate transmit power to the port $p_i$ with a small path loss as much as possible, and obtained $P_{\mathit{eff}}$ is 20.529 dBm. By comparison, in the diversity sending solution in the conventional technology, $P_{\mathit{eff}}$ obtained in a solution in which transmit power is evenly allocated to $p_i$ and $p_j$ is only 19.754. Therefore, the power configuration method shown in Scenario 1 can increase $P_{\mathit{eff}}$ received by the network device, and therefore can improve uplink transmission performance.

For still another example, in a case shown by an index 8 in Table 8, when path losses of $p_i$ and $p_j$ are different, and maximum transmit power supported by $p_j$ is lower, the terminal device allocates transmit power to the port $p_i$ with a small path loss and larger (or largest) maximum transmit power as much as possible, and obtained $P_{\mathit{eff}}$ is 20.529 dBm. By comparison, in the diversity sending solution in the conventional technology, $P_{\mathit{eff}}$ obtained in a solution in which transmit power is evenly allocated to $p_i$ and $p_j$ is only 19.448. Therefore, the power configuration method shown in Scenario 1 can increase $P_{\mathit{eff}}$ received by the network device, and therefore can improve uplink transmission performance.

Scenario 2

During PUSCH sending, to avoid an error caused due to poor uplink and downlink reciprocity when an uplink path loss is estimated by using a downlink path loss, the terminal device may alternatively use an uplink port indicated by the network device as the first port. An example is as follows.

An example in which the terminal device supports uplink sending by using two ports is used. The uplink ports of the terminal device include a port $p_i$ and a port $p_j$, maximum transmit power of the port $p_i$ and maximum transmit power of the port $p_j$ are respectively $P_{max,i}$ and $P_{max,j}$, and linear values are respectively $\hat{P}_{max,i}$ and $\hat{P}_{max,j}$.

Figure 7:
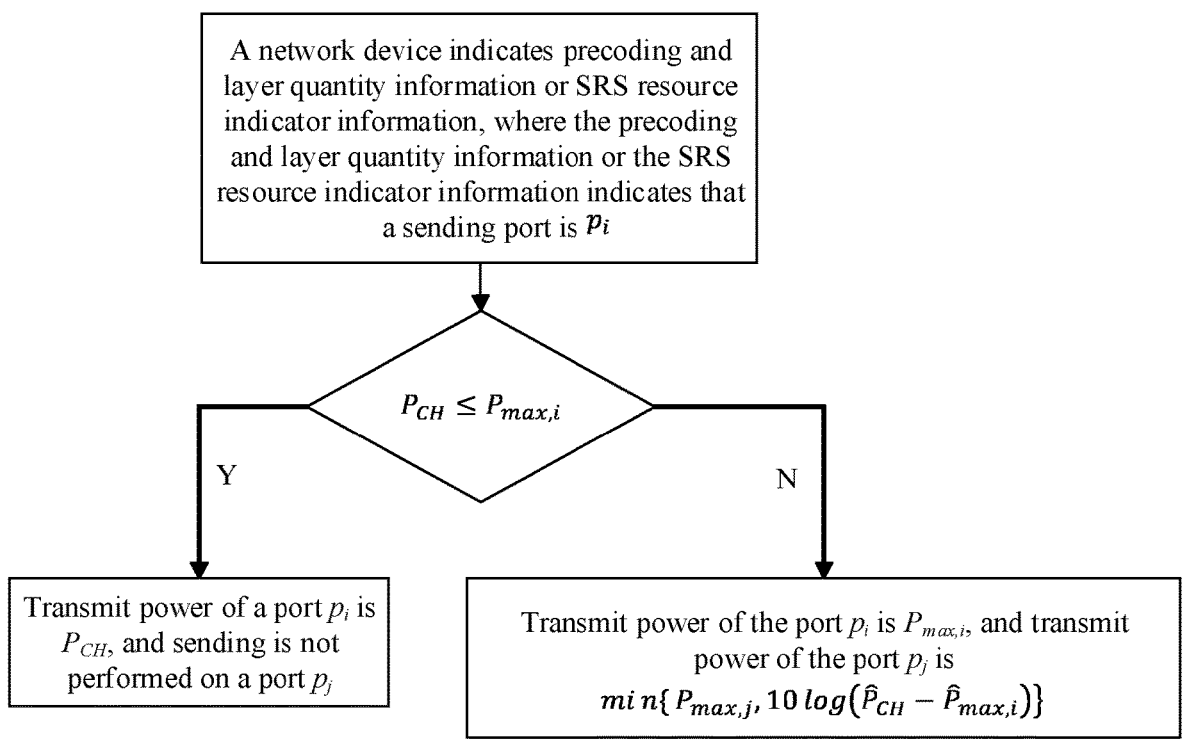
FIG. 7 is a schematic flowchart of another communications method according to an embodiment of this application.

The terminal device sends an SRS through the port $p_i$ and the port $p_j$. The network device may determine respective uplink path losses or uplink signal-to-noise ratios of the port $p_i$ and the port $p_j$ based on the SRS, and determine that $p_i$ is an uplink port with best uplink performance. The network device indicates precoding and layer quantity information or SRS resource indicator information to the terminal device, where the precoding and layer quantity information or the SRS resource indicator information indicates that a sending port is $p_i$. The terminal device may allocate more transmit power to a sending port corresponding to the precoding matrix as much as possible. $p_i$ FIG. 7 is a schematic logical diagram of determining the first port and allocating power by the terminal device.

When $P_{CH} \leq P_{max,i}$, the terminal device may configure transmit power of the port $p_i$ to $P_{CH}$, and sending is not performed on the port $p_j$ (in other words, transmit power of the port $p_j$ is 0). $P_{CH}$ represents calculated transmit power of a PUSCH.

When $P_{CH} > P_{max,i}$, the terminal device may configure transmit power of the port $p_i$ to $P_{max,i}$, and transmit power of the port $p_j$ to min $\{P_{max,j}, 10 \log(\hat{P}_{CH} - \hat{P}_{max,i})\}$. $\hat{P}_{CH}$ represents a linear value of $P_{CH}$.

Based on the foregoing method, in Scenario 2, the terminal device may allocate as much power as possible to the sending port corresponding to the precoding matrix, where the sending port is a port that is determined by the network device based on the SRS and that has good uplink performance. Therefore, in this solution, receive power of the network device is increased as much as possible, thereby improving uplink performance.

Scenario 3

In some cases, the terminal device may not receive a precoding matrix from the network device. For example, when a PUSCH is sent, when a maximum capability of the terminal device supporting uplink MIMO is one layer, and the network device configures an SRS of one port, the network device cannot obtain respective uplink path losses of a plurality of uplink ports, and the network device does not indicate the precoding matrix to the terminal device. Alternatively, when the terminal device sends a PRACH or a PUCCH, the terminal device cannot receive a precoding matrix obtained from the network device, and cannot learn of an uplink port indicated by the network device. To implement proper allocation of uplink transmit power when the terminal device does not receive the precoding matrix sent by the network device, the terminal device may optimize allocation of transmit power based on a difference between respective uplink path losses of uplink ports. An example is as follows.

An example in which the terminal device supports uplink sending by using two ports is used. The uplink ports of the terminal device include a port $p_i$ and a port $p_j$, maximum transmit power of the port $p_i$ and maximum transmit power of the port $p_j$ are respectively $P_{max,i}$ and $P_{max,j}$, and linear values are respectively $\hat{P}_{max,i}$ and $\hat{P}_{max,j}$. An uplink path loss of the port $p_1$ and an uplink path loss of the port $p_2$ are respectively $PL_i$ and $PL_j$, and $PL_i$ and $PL_j$ are respectively obtained through estimation based on a downlink path loss of the port $p_i$ and a downlink path loss of the port $p_j$.

Figure 8:
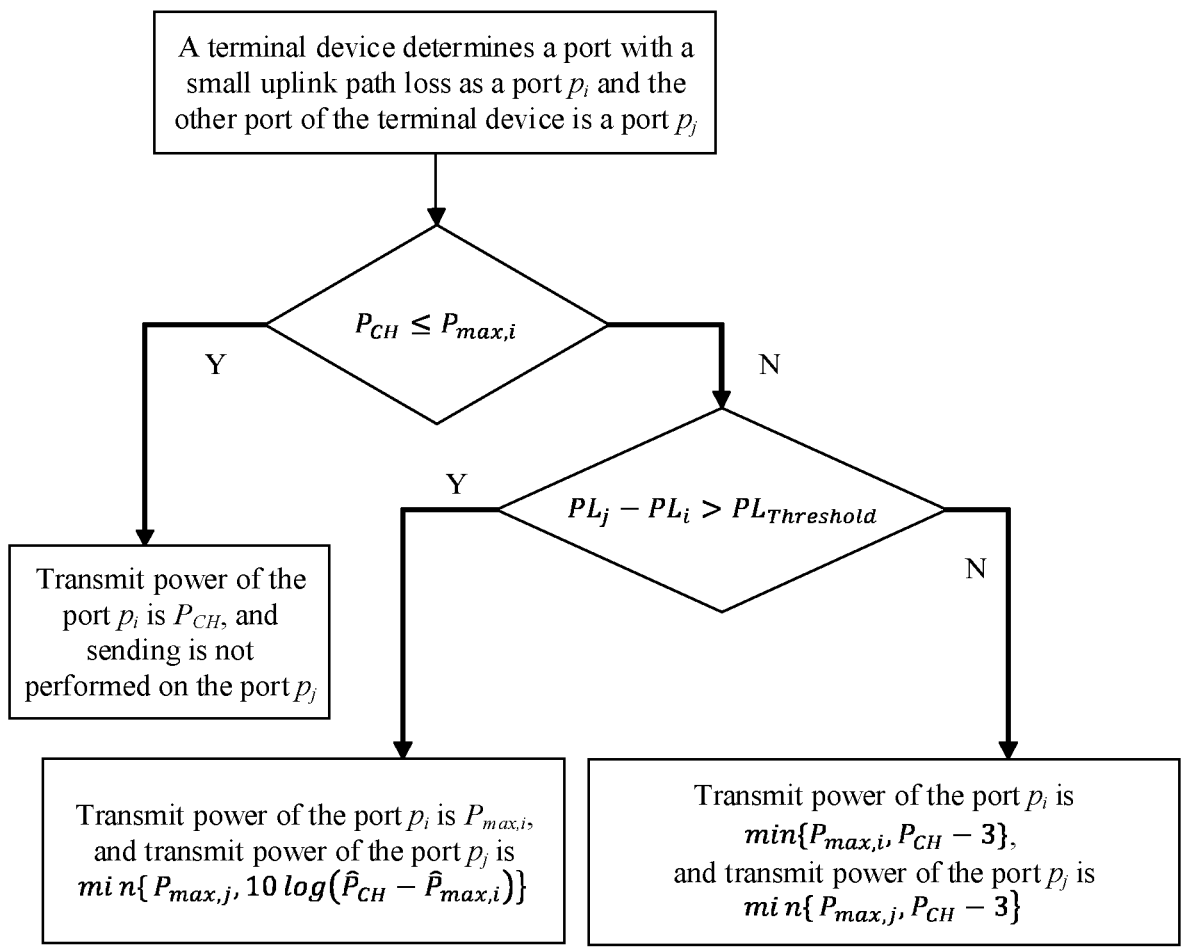
FIG. 8 is a schematic flowchart of another communications method according to an embodiment of this application.

FIG. 8 is a schematic logical diagram of determining the first port and allocating power by the terminal device.

When $PL_i<PL_j$, the terminal device determines that the port $p_i$ is the first port.

After that, the terminal device determines a size of $P_{CH}$ and a size of $P_{max,i}$, where $P_{CH}$ represents calculated transmit power of an uplink channel. The uplink channel herein includes a PRACH, a PUCCH, or a PUSCH.

When $P_{CH} \leq P_{max,i}$, the terminal device may configure transmit power of the port $p_i$ to $P_{CH}$, and sending is not performed on the port $p_j$ (in other words, transmit power of the port $p_j$ is 0).

When $\hat{P}_{CH}>P_{max,i}$, the terminal device may further determine whether a size of $PL_j$ and a size of $PL_i$ meet a specific condition.

For example, the terminal device may determine a size of $PL_j-PL_i$ and a size of $PL_{Threshold}$, where $PL_{Threshold}$ is a specified value.

When $PL_j-PL_i>PL_{Threshold}$, the terminal device may configure transmit power of the port $p_i$ to $P_{max,i}$, and transmit power of the port $p_j$ to min $\{P_{max,j}, 10\log(\hat{P}_{CH}-\hat{P}_{max,i})\} \cdot \hat{P}_{CH}$ represents a linear value of $P_{CH}$.

When $PL_j-PL_i \leq PL_{Threshold}$, the terminal device may configure transmit power of the port $p_i$ to min $\{P_{max,i}, P_{CH}-3\}$, and the terminal device may configure transmit power of the port $p_j$ to min $\{P_{max,i}, P_{CH}-3\}$.

In addition, when $PL_i>PL_j$, the terminal device may determine $p_j$ as the first port. After that, for a manner of determining respective transmit power of the first port and $p_i$, refer to the description of the transmit power allocation manner when $p_i$ is used as the first port in FIG. 8.

Based on the foregoing method, in Scenario 3, the terminal device may determine the first port with a small uplink path loss based on the respective uplink path losses of the uplink ports. When the maximum transmit power of the first port does not exceed the calculated transmit power of the uplink channel, uplink sending is performed through the first port by using the calculated transmit power, to improve uplink performance. When the maximum transmit power of the first port exceeds the calculated transmit power of the uplink channel, whether an uplink path loss of a target uplink port and an uplink path loss of another uplink port meet a specific condition can be considered, to further properly allocate the uplink transmit power. For example, when the specific condition is met, the terminal device may enable the first port to be used to perform sending by using the maximum transmit power, so that receive power of the network device is maximum, thereby improving uplink performance. When the specific condition is not met, the calculated transmit power of the uplink channel is evenly divided for the plurality of uplink ports, thereby improving stability of uplink sending.

Scenario 4

Because the network device needs to perform filtering, which is time consuming, during SRS measurement, when a channel changes, a sending port corresponding to a precoding matrix selected by the network device may not necessarily correspond to a port with a smallest uplink path loss in real time. Therefore, to avoid degradation of uplink performance caused by an error of an uplink path loss determined by the network device based on an SRS, the terminal device may optimize power allocation based on a difference between uplink path losses of the uplink ports. An example is as follows.

An example in which the terminal device supports uplink sending by using two ports is used. The uplink ports of the terminal device include a port $p_i$ and a port $p_j$, maximum transmit power of the port $p_i$ and maximum transmit power of the port $p_j$ are respectively $P_{max,i}$ and $P_{max,j}$, and linear values are respectively $\hat{P}_{max,i}$ and $\hat{P}_{max,j}$. An uplink path loss of the port $p_1$ and an uplink path loss of the port $p_2$ are respectively $PL_i$ and $PL_j$, and $PL_i$ and $PL_j$ are respectively obtained through estimation based on a downlink path loss of the port $p_i$ and a downlink path loss of the port $p_j$.

Figure 9:
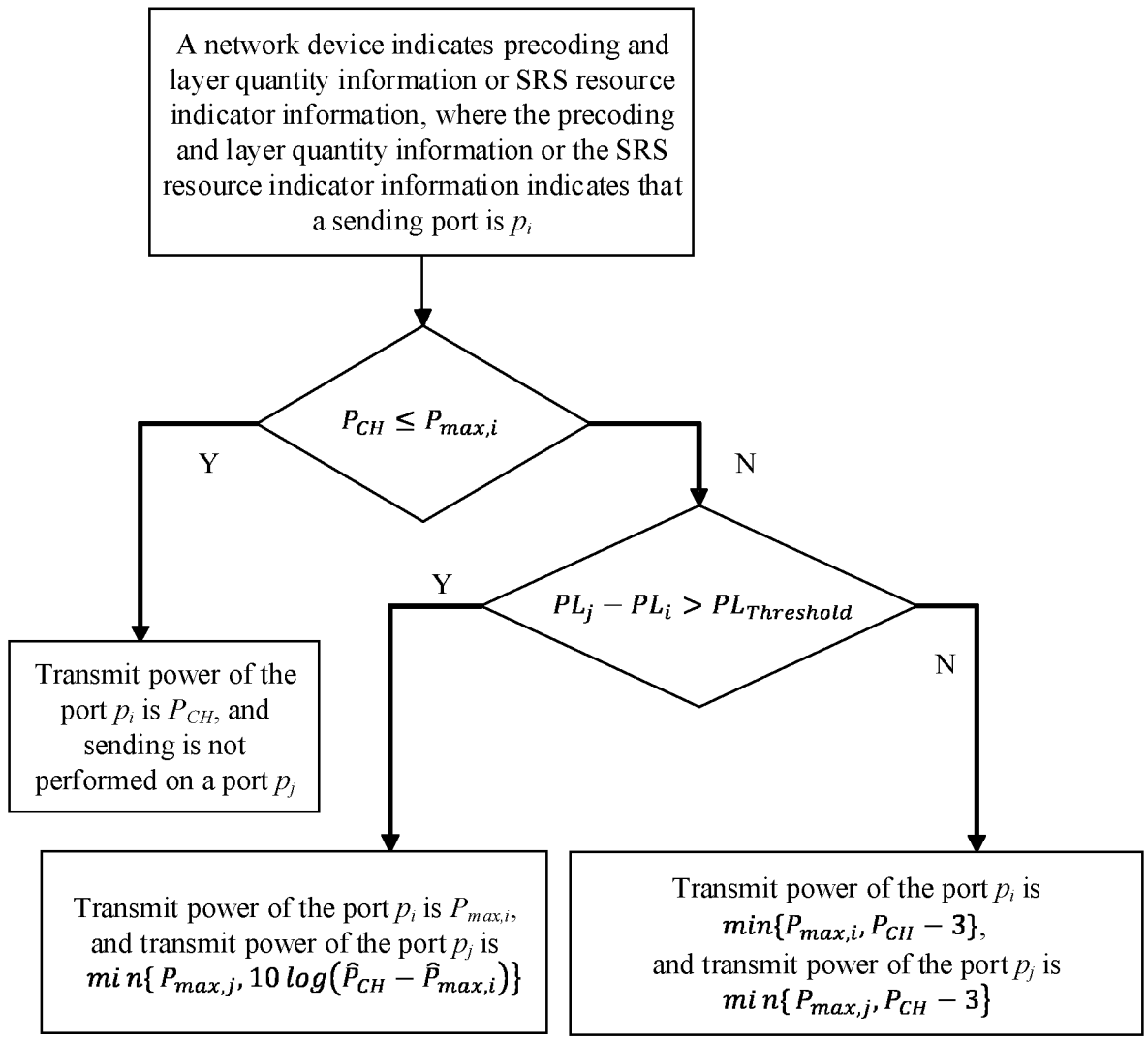
FIG. 9 is a schematic flowchart of another communications method according to an embodiment of this application.

FIG. 9 is a schematic logical diagram of determining the first port and allocating power by the terminal device.

When the network device indicates precoding and layer quantity information or SRS resource indicator information, where the precoding and layer quantity information or the SRS resource indicator information indicates that the sending port is $p_i$, the terminal device determines that the port $p_i$ is the first port.

After that, the terminal device determines a size of $P_{CH}$ and a size of $P_{max,i}$, where $P_{CH}$ represents calculated transmit power of a PUSCH.

When $P_{CH} \leq P_{max,i}$, the terminal device may configure transmit power of the port $p_i$ to $P_{CH}$, and sending is not performed on the port $p_j$ (in other words, transmit power of the port $p_j$ is 0).

When $\hat{P}_{CH}>P_{max,i}$, the terminal device may further determine whether a size of $PL_j$ and a size of $PL_i$ meet a specific condition.

For example, the terminal device may determine a size of $PL_j-PL_i$ and a size of $PL_{Threshold}$, where $PL_{Threshold}$ is a specified value.

When $PL_j-PL_i>PL_{Threshold}$, the terminal device may configure transmit power of the port $p_i$ to $P_{max,i}$, and transmit power of the port $p_j$ to min $\{P_{max,j}, 10\log(\hat{P}_{CH}-\hat{P}_{max,i})\} \cdot \hat{P}_{CH}$ represents a linear value of $P_{CH}$.

When $PL_j-PL_i \leq PL_{Threshold}$, the terminal device may configure transmit power of the port $p_i$ to min $\{P_{max,i}, P_{CH}-3\}$, and the terminal device may configure transmit power of the port $p_j$ to min $\{P_{max,j}, P_{CH}-3\}$.

Based on the foregoing method, in Scenario 4, the terminal device may use the sending port corresponding to the precoding matrix as the first port. When the maximum transmit power of the first port does not exceed the calculated transmit power of the PUSCH, uplink sending is performed through the first port by using the calculated transmit power, to improve uplink performance. When the maximum transmit power of the first port exceeds the calculated transmit power of the PUSCH, whether an uplink path loss of a target uplink port and an uplink path loss of another uplink port meet a specific condition can be considered, to further properly allocate the uplink transmit power. For example, when the specific condition is met, the terminal device may enable the first port to be used to perform sending by using the maximum transmit power, so that receive power of the network device is maximum, thereby improving uplink performance. When the specific condition is not met, the calculated transmit power of the PUSCH is evenly divided for the plurality of uplink ports, thereby improving stability of uplink sending.

It should be understood that, for beneficial effects of the power allocation manners of the terminal device on the ports in Scenario 2 to Scenario 4 above compared with the diversity sending manners in the conventional technology, refer to descriptions of beneficial effects of the power allocation manner in this application in Scenario 1 with reference to Table 3. Details are not described herein again.

Figure 10:
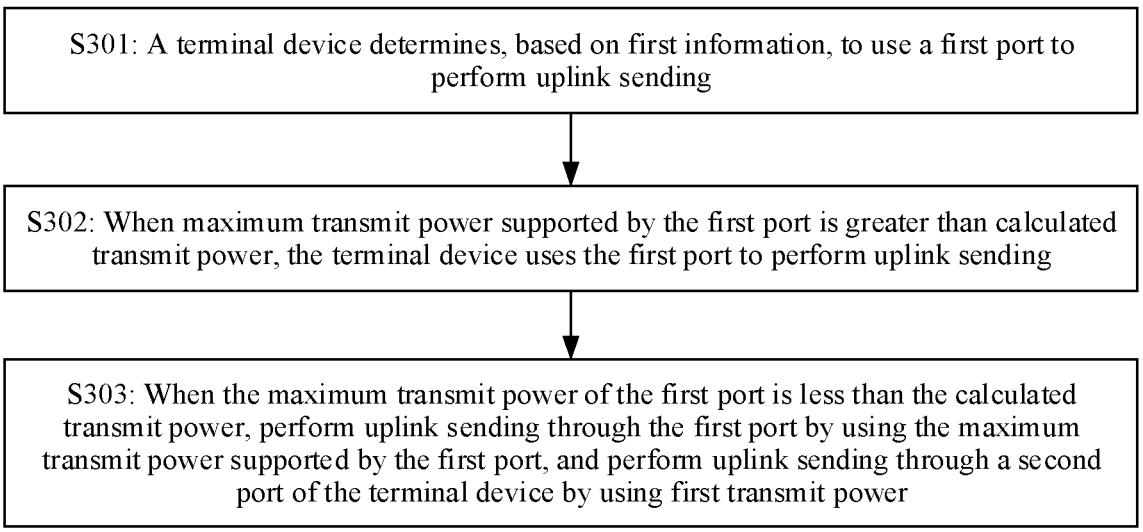
FIG. 10 is a schematic flowchart of another communications method according to an embodiment of this application.

As shown in FIG. 10, an embodiment of this application provides another power configuration method. The method includes the following steps.

S301: A terminal device determines, based on first information, to use a first port to perform uplink sending.

The first information includes at least one or more of the following: an SNR (or SINR), an uplink path loss, an RSSI, RSRP, RSCP, transmission layer quantity information, or a precoding matrix indicator.

S302: When maximum transmit power supported by the first port is greater than calculated transmit power, the terminal device uses (or controls) the first port to perform uplink sending, where the calculated transmit power is uplink transmit power indicated by a network device.

Optionally, transmit power of the first port is the maximum transmit power supported by the first port.

S303: When the maximum transmit power of the first port is less than the calculated transmit power, perform uplink sending through the first port by using the maximum transmit power supported by the first port, and perform uplink sending through a second port of the terminal device by using first transmit power. When transmission is performed through the first port by using the maximum power and uplink sending is performed through the second port by using the first transmit power, total transmit power of the terminal device is enabled to be the calculated transmit power. Alternatively, the first transmit power is maximum transmit power supported by the second port.

For the calculated transmit power, refer to the description in the foregoing embodiment.

Optionally, the first information comes from the network device. For example, the first information includes the transmission layer quantity information and the precoding matrix indicator. The first information is used to instruct to perform uplink sending through the first port. In this case, the second port is a port with a smallest uplink path loss other than the first port.

For example, when the terminal device sends a PUSCH, the terminal device may receive the first information from the network device, where the first information may indicate that an uplink sending port is the first port.

Optionally, in this case, the first information may include uplink scheduling information.

The uplink scheduling information may be included in a DCI format 0_1, and is used to indicate a precoding matrix and a quantity of MIMO layers. The precoding matrix indicates that the PUSCH is sent on only one port. In implementation, the uplink scheduling information includes indication information used to indicate a precoding matrix and indication information used to indicate a quantity of MIMO layers, which are respectively used to indicate the precoding matrix and the quantity of MIMO layers. The precoding matrix is, for example, a precoding matrix corresponding to one of TPMI indexes 0 to 3 shown in Table 1.

Alternatively, the uplink scheduling information may be included in a DCI format 0_1, and is used to indicate one or more SRS resources. The uplink scheduling information indicates only one SRS resource, and the terminal device sends the PUSCH on only one port corresponding to the SRS resource. In implementation, the uplink scheduling information includes an SRI, and the SRI indicates one SRS resource.

In this case, the first port may be a port indicated by the precoding matrix, and the second port is a port of the terminal device that has a smallest uplink path loss other than the first port. The second port may be determined based on downlink path loss information (or uplink path loss information) of a plurality of uplink ports.

Optionally, the first information may further include an SNR (or SINR), an uplink path loss, an RSSI, RSRP, or RSCP determined by the terminal device.

In a possible example, the first port is an uplink port that has a larger (or largest) uplink RSSI and that is determined by the terminal device. Herein, the terminal device may consider by default that an uplink channel and a downlink channel of each uplink port supporting uplink and downlink communication are reciprocal. Therefore, a downlink RSSI of each uplink port may be used as an uplink RSSI of the uplink port, to determine an uplink port with a larger (or largest) uplink RSSI. In this case, it may be considered that the first information includes downlink RSSI information of each uplink port, and the terminal device determines the first port based on the first information.

For example, uplink ports of the terminal device include a port 0 and a port 1. If determining that a downlink RSSI of the port 0 is greater than a downlink RSSI of the port 1, the terminal device may determine the port 0 as the first port. Alternatively, when a downlink RSSI of the port 0 and that of the port 1 are the same, the terminal device may use any one of the port 0 and the port 1 as the first port, for example, select a port with larger (or largest) maximum transmit power as the first port.

In a possible example, the first port is an uplink port that has larger (or largest) uplink RSRP and that is determined by the terminal device. Herein, the terminal device may consider by default that an uplink channel and a downlink channel of each uplink port supporting uplink and downlink communication are reciprocal. Therefore, downlink RSRP of each uplink port may be used as uplink RSRP of the uplink port, to determine an uplink port with larger (or largest) uplink RSRP. In this case, it may be considered that the first information includes downlink RSRP information of each uplink port, and the terminal device determines the first port based on the first information.

For example, uplink ports of the terminal device include a port 0 and a port 1. If determining that downlink RSRP of the port 0 is greater than downlink RSRP of the port 1, the terminal device may determine the port 0 as the first port. Alternatively, when downlink RSRP of the port 0 and that of the port 1 are the same, the terminal device may use any one of the port 0 and the port 1 as the first port, for example, select a port with larger (or largest) maximum transmit power as the first port.

In a possible example, the first port is an uplink port that has a larger (or largest) uplink SNR or SINR and that is determined by the terminal device. Herein, the terminal device may consider by default that an uplink channel and a downlink channel of each uplink port supporting uplink and downlink communication are reciprocal. Therefore, a downlink SNR/SINR of each uplink port may be used as an uplink SNR/SINR of the uplink port, to determine an uplink port with a larger (largest) uplink SNR/SINR. In this case, it may be considered that the first information includes downlink SNR/SINR information of each uplink port, and the terminal device determines the first port based on the first information.

In a possible example, the first port is an uplink port that has a smallest uplink path loss and that is determined by the terminal device. The first information may further indicate respective uplink path losses of the plurality of uplink ports, the first port is a port with a smallest uplink path loss in the plurality of uplink ports, and the second port includes a port with a second smallest uplink path loss in the plurality of uplink ports. For example, the first information includes respective downlink path loss information of the uplink ports, where the downlink path loss information of the uplink port may be used to estimate an uplink path loss of the uplink port. Alternatively, the first information may include respective uplink path loss information of the uplink ports.

It should be understood that, when the terminal device sends a PUSCH, the terminal device does not receive a precoding matrix from the network device. In this case, the terminal device may determine the first port based on respective SNRs (or SINRs), uplink path losses, RSSIs, RSRP, or RSCP of the plurality of uplink ports. For example, in the foregoing description of a procedure part shown in FIG. 5A, the uplink scheduling information received by the terminal device from the network device is included in the DCI format 0_0, and is used to instruct the terminal to send single-stream data on the single port, but the uplink scheduling information does not include a precoding matrix.

It should be further understood that when the terminal device sends a PRACH or a PUCCH, the terminal device may determine the first port based on respective SNRs (or SINRs), uplink path losses, RSSIs, RSRP, or RSCP of the plurality of uplink ports. For example, in the foregoing description of a procedure part shown in FIG. 5B, when the terminal initiates a random access procedure, or when the terminal needs to send UCI, and the UCI cannot be reused for sending on the PUSCH, the terminal device may determine the first port and the second port based on respective uplink path losses of the plurality of uplink ports.

According to the procedure shown in FIG. 10, the terminal device allocates more uplink transmit power to the first port as much as possible, and sends the remaining power to the second port with a smallest uplink path loss, so that receive power for receiving an uplink signal by the network device is maximized, thereby improving uplink performance.

For example, the first transmit power may be represented as min $\{P_{max,j}, 10 \log(\hat{P}_{CH}-\hat{P}_{max,i})\}$.

$P_{max,j}$ represents the maximum transmit power of the second port. $\hat{P}_{CH}$ represents a linear value of the calculated transmit power, and the linear value of the calculated transmit power is determined based on the calculated transmit power. $\hat{P}_{max,i}$ represents a linear value of the maximum transmit power of the first port, and the linear value of the maximum transmit power of the first port is determined based on the maximum transmit power of the first port. min $\{a, b\}$ represents that a smallest value of a and b is used.

It should be understood that when the first transmit power is $10 \log(\hat{P}_{CH}-\hat{P}_{max,i})$, the total transmit power used by the terminal device to perform sending through the first port and the second port is enabled to be the calculated transmit power.

Optionally, when the terminal device determines, based on the first information, to perform uplink sending through the first port and the second port, uplink sending may be performed through the first port and the second port by using the third transmit power. When uplink sending is performed through the first port and the second port by using the third transmit power, the total transmit power of the terminal device is the calculated transmit power. Alternatively, when the third transmit power is greater than the maximum transmit power supported by the first port, the maximum transmit power supported by the first port may be used for the first port, and the third transmit power may be used for the second port. Alternatively, when the third transmit power is greater than the maximum transmit power supported by the second port, the maximum transmit power supported by the second port may be used for the second port. Alternatively, when the third transmit power is greater than the maximum transmit power supported by the first port, and the third transmit power is greater than the maximum transmit power supported by the second port, the maximum transmit power supported by the first port may be used for the first port, and the maximum transmit power supported by the second port may be used for the second port.

In other words, when the terminal device determines, based on the first information, to perform uplink sending through the first port and the second port, the transmit power of the first port may be represented as min $\{P_{max,i}, P_{CH}-3\}$, and the transmit power of the first port may be represented as min $\{P_{max,j}, P_{CH}-3\}$. $P_{max,i}$ represents the maximum transmit power of the first port. $P_{max,j}$ represents the maximum transmit power of the second port. $P_{CH}$ represents transmit power of the calculated transmit power. min $\{a, b\}$ represents that a smallest value of a and b is used. It should be understood that, when transmit power of the first port is ($P_{CH}-3$), and transmit power of the second port is ($P_{CH}-3$), the total transmit power used by the terminal device to perform sending through the first port and the second port is enabled to be the calculated transmit power ($P_{CH}-3$), which may be referred to as the third transmit power in this application.

Optionally, after determining that the first port and the second port meet a specific condition, the terminal device may perform the method shown in FIG. 10. For setting of the specific condition, refer to the foregoing description. For example, in an example in which the first information includes an uplink path loss, the specific condition includes that a difference between an uplink path loss of the second port and an uplink path loss of the first port is greater than a specified value, where if the uplink path loss of the second port is greater than the uplink path loss of the first port, the specified value is greater than 0, for example, the specified value is 1.

Otherwise, if the terminal device determines that the second port and the first port do not meet a specific condition, the terminal device may configure (or control) the transmit power of the first port based on the maximum transmit power of the first port and the calculated transmit power, and configure the transmit power of the second port based on the maximum transmit power of the second port and an accounting rate.

For example, if determining that the second port and the first port do not meet the specific condition, the terminal device may evenly divide the calculated transmit power for the first port and the second port. For example, the transmit power of the first port may be represented as min $\{P_{max,i}, P_{CH}-3\}$, and the transmit power of the first port may be represented as min $\{P_{max,j}, P_{CH}-3\}$. $P_{max,i}$ represents the maximum transmit power of the first port. $P_{max,j}$ represents the maximum transmit power of the second port. $P_{CH}$ represents transmit power of the calculated transmit power. min $\{a, b\}$ represents that a smallest value of a and b is used.

It should be understood that, when transmit power of the first port is ($P_{CH}$−3), and transmit power of the second port is ($P_{CH}$−3), the total transmit power used by the terminal device to perform sending through the first port and the second port is enabled to be the calculated transmit power ($P_{CH}$−3), which may be referred to as the third transmit power in this application.

The following uses two uplink ports as an example, to provide differences by comparing the power configuration method provided in the embodiment shown in FIG. 10 with the power configuration method in the conventional technology by using a chart.

Table 5 shows respective power allocation manners used when the calculated transmit power is greater than the maximum transmit power supported by the first port, in cases of sending a PRACH, sending a PUCCH, sending a PUSCH scheduled by using a DCI format 0_0, non-codebook-based PUSCH sending, and codebook-based PUSCH sending in the solution shown in FIG. 10 of this application.

It can be learned that, when the manner shown in FIG. 10 is used, sending is performed through the first port by using the maximum transmit power, and the maximum transmit power may be used for the second port or total power used by the terminal device to perform sending through the first

TABLE 4

| Scenario | Terminal capability | Quantity of uplink ports indicated by a network device | How to select a first port? | Power allocation manner of $P_1$ and $P_2$ when calculated transmit power is greater than $P_{max,1}$ |
|---|---|---|---|---|
| PRACH PUCCH PUSCH (scheduled by using a DCI format 0_0) | 2T | — | SNR (or SINR), uplink path loss, RSSI, RSRP, and/or RSCP | $P_1 = \min \{P_{max,1}, P_{CH} - 3\}$; $P_2 = \min \{P_{max,2}, P_{CH} - 3\}$ |
| PUSCH (non-codebook-based) | | 1T | Determined based on an SRS resource indicator | |
| PUSCH (codebook-based) | | | Determined based on transmission layer quantity information and a precoding matrix indicator | |

Table 4 shows respective power allocation manners used when the calculated transmit power is greater than the maximum transmit power supported by the first port, in cases of sending a PRACH, sending a PUCCH, sending a PUSCH scheduled by using a DCI format 0_0, non-codebook-based PUSCH sending, and codebook-based PUSCH transmission in the conventional technology.

port and the second port reaches the calculated transmit power. Compared with the conventional technology, receive power of the network device is higher, and therefore an uplink power allocation manner of the terminal device is optimized.

With reference to the accompanying drawings, the following describes a communications apparatus configured to

TABLE 5

| Scenario | Terminal capability | Quantity of uplink ports indicated by a network device | How to select a first port? | Power allocation manner of $P_1$ and $P_2$ when calculated transmit power is greater than $P_{max,1}$ |
|---|---|---|---|---|
| PRACH PUCCH PUSCH (scheduled by using a DCI format 0_0) | 2T | — | SNR (or SINR), uplink path loss, RSSI, RSRP, and/or RSCP | $P_1 = P_{max,1}$; $P_2 = \min \{P_{max,2}, 10 \log(\hat{P}_{CH} - \hat{P}_{max,1})\}$ |
| PUSCH (non-codebook-based) | | 1T | Determined based on an SRS resource indicator | |
| PUSCH (codebook-based) | | | Determined based on transmission layer quantity information and a precoding matrix indicator | | implement the foregoing methods in embodiments of this application. Therefore, all the foregoing content may be used in subsequent embodiments. Repeated content is not described again.

Figure 11:
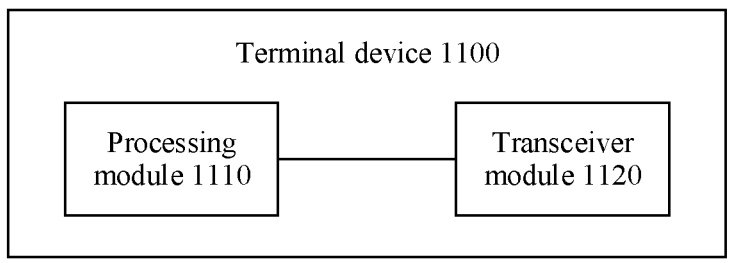
FIG. 11 is a schematic diagram of a structure of a communications apparatus according to an embodiment of this application.

FIG. 11 is a schematic block diagram of a communications apparatus according to an embodiment of this application. For example, the communications apparatus is, for example, a terminal device 1100 shown in FIG. 11.

The terminal device 1100 includes a processing module 1110 and a transceiver module 1120. For example, the terminal device 1100 may be a network device, or may be a chip applied to the terminal device, or another combination device, component, or the like that has a function of the terminal device. When the terminal device 1100 is a terminal device, the transceiver module 1120 may be a transceiver, where the transceiver may include an antenna, a radio frequency circuit, and the like; and the processing module 1110 may be a processor, for example, a baseband processor, where the baseband processor may include one or more central processing units (central processing units, CPUs). When the terminal device 1100 is a component having a function of the terminal device, the transceiver module 1120 may be a radio frequency unit, and the processing module 1110 may be a processor, for example, a baseband processor. When the terminal device 1100 is a chip system, the transceiver module 1120 may be an input/output interface of a chip (for example, a baseband chip), and the processing module 1110 may be a processor of the chip system, and may include one or more central processing units. It should be understood that the processing module 1110 in this embodiment of this application may be implemented by a processor or a processor-related circuit component, and the transceiver module 1120 may be implemented by a transceiver or a transceiver-related circuit component.

For example, the processing module 1110 may be configured to perform all operations, for example, S102 and S302, performed by the terminal device, other than the transceiver operation in any one of the embodiments shown in FIG. 5A, FIG. 5B, or FIG. 10, and/or another process used to support the technology described in this specification, for example, generating a message, information, and/or signaling transmitted by the transceiver module 1120 and processing a message, information, and/or signaling received by the transceiver module 1120, and for another example, an action of determining, based on the sixth information and the seventh information, that the first periodicity is the CSI resource periodicity and/or the CSI reporting periodicity in the procedure shown in FIG. 4. The transceiver module 1120 may be configured to perform all sending and receiving operations, for example, S101, S201, S202, and S301, performed by the terminal device in any one of the embodiments shown in FIG. 5A, FIG. 5B, or FIG. 10, and/or another process used to support the technology described this specification, for example, sending a CSI report based on a CSI report configuration, or for another example, not sending a CSI report.

In addition, the transceiver module 1120 may be a functional module, and the functional module can complete both a sending operation and a receiving operation. For example, the transceiver module 1120 may be configured to perform all sending operations and receiving operations performed by the terminal device in any one of the embodiments shown in FIG. 5A, FIG. 5B, or FIG. 10. For example, when a sending operation is performed, it may be considered that the transceiver module 1120 is a sending module. However, when a receiving operation is performed, it may be considered that the transceiver module 1120 is a receiving module.

Alternatively, the transceiver module 1120 may be two functional modules, and the transceiver module 1120 may be considered as a general term of the two functional modules. The two functional modules are respectively a sending module and a receiving module. The sending module is configured to complete a sending operation. For example, the sending module may be configured to perform all the sending operations performed by the terminal device in any one of the embodiments shown in FIG. 5A, FIG. 5B, or FIG. 10. The receiving module is configured to complete a receiving operation. For example, the receiving module may be configured to perform all the receiving operations performed by the terminal device in any one of the embodiments in FIG. 5A, FIG. 5B, or FIG. 10.

When the method shown in FIG. 5A is performed, the transceiver module 1110 may be configured to perform the step shown in S101, and the processing module 1120 may be configured to perform the steps shown in S102 and S103. When the method shown in FIG. 5B is performed, the processing module 1120 may be configured to perform the steps shown in S201 to S203.

When the method shown in FIG. 10 is performed, the processing module 1120 may be configured to perform S301 to S303.

Specifically, the processing module 1120 may be configured to determine, based on first information, to use a first port to perform uplink sending. When maximum transmit power supported by the first port is greater than calculated transmit power, the processing module 1120 is configured to configure the first port to be used to perform uplink sending, where the calculated transmit power is uplink transmit power indicated by a network device. When the maximum transmit power of the first port is less than the calculated transmit power, the processing module 1120 is configured to: configure the first port to be used to perform uplink sending by using the maximum transmit power supported by the first port, and configure a second port of the terminal device to be used to perform uplink sending by using first transmit power. When transmission is performed through the first port by using the maximum power and uplink sending is performed through the second port by using the first transmit power, total transmit power of the terminal device is enabled to be the calculated transmit power, or the first transmit power is the maximum transmit power supported by the second port. The first information includes at least one or more of the following: an SNR (or SINR), an uplink path loss, an RSSI, RSRP, RSCP, precoding and layer quantity information, and SRS resource indicator information. The precoding and layer quantity information and the SRS resource indicator information may be received by the transceiver module 1110.

In a possible design, when the first information includes the SNR (or SINR), the processing module 1120 may select, from a plurality of ports of the terminal device, a port with a largest SNR (or SINR) as the first port. Optionally, in this case, the processing module 1120 uses a port with a second largest SNR (or SINR) as the second port. Alternatively, when the first information includes the uplink path loss, the processing module 1120 selects, from a plurality of ports of the terminal device, a port with a smallest uplink path loss as the first port. Optionally, in this case, the processing module 1120 uses a port with a second smallest uplink path loss as the second port. Alternatively, when the first information includes the RSSI, the processing module 1120 selects, from a plurality of ports of the terminal device, a port with a largest RSSI as the first port. Optionally, in this case, the processing module 1120 uses a port with a second largest RSSI as the second port. Alternatively, when the first information includes the RSRP, the processing module 1120 selects, from a plurality of ports of the terminal device, a port with largest RSRP as the first port. Optionally, the processing module 1120 uses a port with second largest RSRP as the second port. Alternatively, when the first information includes the RSCP, the processing module 1120 selects, from a plurality of ports of the terminal device, a port with largest RSCP as the first port. Optionally, in this case, the processing module 1120 uses a port with second largest RSCP as the second port.

In a possible design, when the terminal device determines, based on the first information, to use the first port and the second port to perform uplink sending, the processing module 1120 may configure the first port to be used to perform uplink sending by using third transmit power, and configure the second port to be used to perform uplink sending by using the third transmit power, where when uplink sending is performed through the first port and the second port by using the third transmit power, the total transmit power of the terminal device is enabled to be the calculated transmit power.

Alternatively, the processing module 1120 may configure the first port to be used to perform uplink sending by using the maximum transmit power supported by the first port, and configure the second port to be used to perform uplink sending by using the third transmit power.

Alternatively, the processing module 1120 may configure the first port to be used to perform uplink sending by using the third transmit power, and configure the second port to be used to perform uplink sending by using the maximum transmit power supported by the second port.

Alternatively, the processing module 1120 may configure the first port to be used to perform uplink sending by using the maximum transmit power supported by the first port, and configure the second port to be used to perform uplink sending by using the maximum transmit power supported by the second port.

In a possible design, the first transmit power may be represented as min $\{P_{max,j}, 10 \log(\hat{P}_{CH} - \hat{P}_{max,i})\}$. $P_{max,j}$ represents the maximum transmit power of the second port. $\hat{P}_{CH}$ represents a linear value of the calculated transmit power, and the linear value of the calculated transmit power is determined based on the calculated transmit power. $\hat{P}_{max,i}$ represents a linear value of the maximum transmit power of the first port, and the linear value of the maximum transmit power of the first port is determined based on the maximum transmit power of the first port. min $\{a, b\}$ represents that a smallest value of a and b is used.

In a possible design, the processing module 1120 may determine that the first port and the second port meet a specific condition. When the first information includes the SNR, the specific condition includes: A difference between an SNR of the first port and an SNR of the second port is greater than a specified value, the SNR of the first port is greater than the SNR of the second port, and the specified value is greater than 0. When the first information includes the uplink path loss, the specific condition includes: A difference between an uplink path loss of the second port and an uplink path loss of the first port is greater than a specified value, the uplink path loss of the second port is greater than the uplink path loss of the first port, and the specified value is greater than 0. When the first information includes the RSSI, the specific condition includes: A difference between an RSSI of the first port and an RSSI of the second port is greater than a specified value, and the RSSI of the first port is greater than the RSSI of the second port, and the specified value is greater than 0. When the first information includes the RSRP, the specific condition includes: A difference between RSRP of the first port and RSRP of the second port is greater than a specified value, the RSRP of the first port is greater than the RSRP of the second port, and the specified value is greater than 0. When the first information includes the RSCP, the specific condition includes: A difference between RSCP of the first port and RSCP of the second port is greater than a specified value, the RSCP of the first port is greater than the RSCP of the second port, and the specified value is greater than 0.

In a possible design, if the processing module 1120 determines that the second port and the first port do not meet the foregoing specific condition, the processing module 1120 may configure the first port to be used to perform uplink sending by using the third transmit power, and configure the second port to be used to perform uplink sending by using the third transmit power, where when uplink sending is performed through the first port and the second port by using the third transmit power, the total transmit power of the terminal device is enabled to be the calculated transmit power.

Alternatively, the processing module 1120 may configure the first port to be used to perform uplink sending by using the maximum transmit power supported by the first port, and configure the second port to be used to perform uplink sending by using the third transmit power.

Alternatively, the processing module 1120 may configure the first port to be used to perform uplink sending by using the third transmit power, and configure the second port to be used to perform uplink sending by using the maximum transmit power supported by the second port.

Alternatively, the processing module 1120 may configure the first port to be used to perform uplink sending by using the maximum transmit power supported by the first port, and configure the second port to be used to perform uplink sending by using the maximum transmit power supported by the second port.

In a possible design, the third transmit power may be represented as $P_{CH} - 3$. $P_{CH}$ represents the calculated transmit power. min $\{a, b\}$ represents that a smallest value of a and b is used.

For example, the transceiver module 1110 may be implemented by at least one component of the Tx signal processing unit, the Rx signal processing unit, the Tx radio frequency channel, the Rx radio frequency channel, or the antenna shown in FIG. 2. The processing module 1120 may be implemented by the processor shown in FIG. 2.

In addition, the communications apparatus may include the structure shown in FIG. 2. When the method shown in FIG. 5A is performed, at least one component of the Rx signal processing unit, the Rx radio frequency channel, or the antenna shown in FIG. 2 may be configured to perform the step shown in S101, and the processor may be configured to invoke a computer program or instructions stored in a memory, to perform the steps shown in S102 and S103. When the method shown in FIG. 5B is performed, the processor may be configured to invoke a computer program or instructions stored in a memory, to perform the steps shown in S201 to S203.

When the method shown in FIG. 10 is performed, the processor may be configured to invoke a computer program or instructions stored in a memory, to perform the steps shown in S301 to S303.

Specifically, the processor may be configured to determine, based on the first information, to use the first port to perform uplink sending. When the maximum transmit power supported by the first port is greater than the calculated transmit power, the processor is configured to configure the first port to be used to perform uplink sending, where the calculated transmit power is the uplink transmit power indicated by the network device. When the maximum transmit power of the first port is less than the calculated transmit power, the processor is configured to: configure the first port to be used to perform uplink sending by using the maximum transmit power supported by the first port, and configure the second port of the terminal device to be used to perform uplink sending by using the first transmit power, where when transmission is performed through the first port by using the maximum power and uplink sending is performed through the second port by using the first transmit power, total transmit power of the terminal device is enabled to be the calculated transmit power, or the first transmit power is the maximum transmit power supported by the second port. The first information includes at least one or more of the following: an SNR (or SINR), an uplink path loss, an RSSI, RSRP, RSCP, precoding and layer quantity information, and SRS resource indicator information.

In a possible design, when the first information includes the SNR (or SINR), the processor may select, from a plurality of ports of the terminal device, a port with a largest SNR (or SINR) as the first port. Optionally, in this case, the processor uses a port with a second largest SNR (or SINR) as the second port. Alternatively, when the first information includes the uplink path loss, the processor selects, from a plurality of ports of the terminal device, a port with a smallest uplink path loss as the first port. Optionally, in this case, the processor uses a port with a second smallest uplink path loss as the second port. Alternatively, when the first information includes the RSSI, the processor selects, from a plurality of ports of the terminal device, a port with a largest RSSI as the first port. Optionally, in this case, the processor uses a port with a second largest RSSI as the second port. Alternatively, when the first information includes the RSRP, the processor selects, from a plurality of ports of the terminal device, a port with largest RSRP as the first port. Optionally, the processor uses a port with second largest RSRP as the second port. Alternatively, when the first information includes the RSCP, the processor selects, from a plurality of ports of the terminal device, a port with largest RSCP as the first port. Optionally, in this case, the processor uses a port with second largest RSCP as the second port.

In a possible design, when the terminal device determines, based on the first information, to use the first port and the second port to perform uplink sending, the processor may configure the first port to be used to perform uplink sending by using the third transmit power, and configure the second port to be used to perform uplink sending by using the third transmit power, where when uplink sending is performed through the first port and the second port by using the third transmit power, the total transmit power of the terminal device is enabled to be the calculated transmit power.

Alternatively, the processor may configure the first port to be used to perform uplink sending by using the maximum transmit power supported by the first port, and configure the second port to be used to perform uplink sending by using the third transmit power.

Alternatively, the processor may configure the first port to be used to perform uplink sending by using the third transmit power, and configure the second port to be used to perform uplink sending by using the maximum transmit power supported by the second port.

Alternatively, the processor may configure the first port to be used to perform uplink sending by using the maximum transmit power supported by the first port, and configure the second port to be used to perform uplink sending by using the maximum transmit power supported by the second port.

In a possible design, the first transmit power may be represented as min $\{P_{max,j}, 10 \log(\hat{P}_{CH}-\hat{P}_{max,i})\}$ $P_{max,j}$ represents the maximum transmit power of the second port. $\hat{P}_{CH}$ represents a linear value of the calculated transmit power, and the linear value of the calculated transmit power is determined based on the calculated transmit power. $\hat{P}_{max,i}$ represents a linear value of the maximum transmit power of the first port, and the linear value of the maximum transmit power of the first port is determined based on the maximum transmit power of the first port. min $\{a, b\}$ represents that a smallest value of a and b is used.

In a possible design, the processor may determine that the first port and the second port meet a specific condition. When the first information includes the SNR, the specific condition includes: A difference between an SNR of the first port and an SNR of the second port is greater than a specified value, the SNR of the first port is greater than the SNR of the second port, and the specified value is greater than 0. When the first information includes the uplink path loss, the specific condition includes: A difference between an uplink path loss of the second port and an uplink path loss of the first port is greater than a specified value, the uplink path loss of the second port is greater than the uplink path loss of the first port, and the specified value is greater than 0. When the first information includes the RSSI, the specific condition includes: A difference between an RSSI of the first port and an RSSI of the second port is greater than a specified value, and the RSSI of the first port is greater than the RSSI of the second port, and the specified value is greater than 0. When the first information includes the RSRP, the specific condition includes: A difference between RSRP of the first port and RSRP of the second port is greater than a specified value, the RSRP of the first port is greater than the RSRP of the second port, and the specified value is greater than 0. When the first information includes the RSCP, the specific condition includes: A difference between RSCP of the first port and RSCP of the second port is greater than a specified value, the RSCP of the first port is greater than the RSCP of the second port, and the specified value is greater than 0.

In a possible design, if the processor determines that the second port and the first port do not meet the foregoing specific condition, the processor may configure the first port to be used to perform uplink sending by using the third transmit power, and configure the second port to be used to perform uplink sending by using the third transmit power, where when uplink sending is performed through the first port and the second port by using the third transmit power, the total transmit power of the terminal device is enabled to be the calculated transmit power.

Alternatively, the processor may configure the first port to be used to perform uplink sending by using the maximum transmit power supported by the first port, and configure the second port to be used to perform uplink sending by using the third transmit power.

Alternatively, the processor may configure the first port to be used to perform uplink sending by using the third transmit power, and configure the second port to be used to perform uplink sending by using the maximum transmit power supported by the second port.

Alternatively, the processor may configure the first port to be used to perform uplink sending by using the maximum transmit power supported by the first port, and configure the second port to be used to perform uplink sending by using the maximum transmit power supported by the second port.

In a possible design, the third transmit power may be represented as $P_{CH}$–3. $P_{CH}$ represents the calculated transmit power. min {a, b} represents that a smallest value of a and b is used.

It should be understood that the processor and the transceiver described in this application may be implemented in an integrated circuit (integrated circuit, IC), an analog IC, a radio frequency integrated circuit RFIC, a mixed-signal IC, an application-specific integrated circuit (application-specific integrated circuit, ASIC), a printed circuit board (printed circuit, PCB), an electronic device, and the like. The processor and the transceiver may be alternatively manufactured by using various IC process techniques, such as a complementary metal oxide semiconductor (complementary metal oxide semiconductor, CMOS), an N-type metal-oxide-semiconductor (N-type metal-oxide-semiconductor, NMOS), a P-channel metal-oxide-semiconductor (P-channel metal-oxide-semiconductor, PMOS), a bipolar junction transistor (bipolar junction transistor, BJT), a bipolar CMOS (BiCMOS), silicon germanium (SiGe), gallium arsenide (GaAs), and the like.

The apparatus described in the foregoing embodiment may be a terminal device or a network device. However, a scope of the apparatus described in this application is not limited thereto, and a structure of the apparatus may not be limited in FIG. 2 and FIG. 11. The apparatus may be an independent device or may be a part of a large device. For example, the apparatus may be:

(1) an independent integrated circuit IC, a chip, or a chip system or subsystem;
(2) a set of one or more ICs, where optionally, the IC set may also include a storage component configured to store data and/or instructions;
(3) an ASIC, for example, a modem (MSM);
(4) a module that can be embedded in another device;
(5) a receiver, a terminal, an intelligent terminal, a cellular phone, a wireless device, a handset, a mobile unit, a vehicle-mounted device, a network device, a cloud device, an artificial intelligence device, a machinery device, a household device, a medical device, an industrial device, and the like; and
(6) Others.

It should be understood that the components included in the communications apparatus in the foregoing embodiment are examples, and are merely a possible example, and the communications apparatus may have another composition manner during actual implementation. In addition, the components in the foregoing communications apparatus may be integrated into one module, or may exist independently physically. The integrated module may be implemented in a form of hardware, or may be implemented in a form of a software functional module, and it should not be understood that the structure shown in the foregoing accompanying drawings is limited.

Based on a concept the same as that of the foregoing method embodiments, an embodiment of this application further provides a computer-readable storage medium. The computer-readable storage medium stores a computer program. When the program is executed by a processor, a computer is enabled to perform an operation performed by the terminal device in any one of the foregoing method embodiments or the possible implementations of the method embodiments.

Based on a concept the same as that of the foregoing method embodiments, this application further provides a computer program product. When the computer program product is invoked and executed by a computer, the computer may be enabled to implement an operation performed by the terminal device in any one of the foregoing method embodiments or the possible implementations of the method embodiments.

Based on a concept the same as that of the foregoing method embodiments, this application further provides a chip or a chip system. The chip may include a processor. The chip may further include a memory (or a storage module) and/or a transceiver (or a communications module), or the chip is coupled to a memory (or a storage module) and/or a transceiver (or a communications module). The transceiver (or the communications module) may be configured to support the chip in performing wired and/or wireless communication, and the memory (or the storage module) may be configured to store a program. The processor may invoke the program to implement an operation performed by the terminal device in any one of the foregoing method embodiments or the possible implementations of the method embodiments. The chip system may include the foregoing chip, or may include the foregoing chip and another discrete component, such as a memory (or a storage module) and/or a transceiver (or a communications module).

It should be understood that the memory in this application may be configured to store at least a computer program or instructions, and/or store information and data in the embodiments of this application. The computer program may be invoked by the processor (or a processing unit or a processing module), to perform the method in the embodiments of this application. The memory may be a flash (flash) memory, a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory is not limited thereto. The memory may exist independently, and is connected to the processor by using a bus. Alternatively, the memory may be integrated with the processor.

Based on a concept the same as that of the foregoing method embodiments, this application further provides a communications system. The communications system may be configured to implement an operation performed by the first terminal device and/or the second terminal device in any one of the foregoing method embodiments or the possible implementations of the method embodiments. For example, the communications system has an architecture shown in FIG. 1.

The embodiments of this application are described with reference to flowcharts and/or block diagrams of the method, the apparatus, and the computer program product in the embodiments. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

What is claimed is:

1. A power configuration method, comprising:
   determining, by a terminal device based on first information, to use a first port to perform uplink sending;
   when maximum transmit power supported by the first port is greater than calculated transmit power, performing, by the terminal device, uplink sending by using the first port, the calculated transmit power being indicated by a network device; and
   when the maximum transmit power of the first port is less than the calculated transmit power, dividing uplink sending between the first port and a second port of the terminal device by performing uplink sending through the first port by using the maximum transmit power supported by the first port, and performing a remaining portion of uplink sending through the second port of the terminal device by using first transmit power so that total transmit power of the terminal device is enabled to be the calculated transmit power, or the first transmit power is maximum transmit power supported by the second port, wherein
   the first information comprises at least one or more of the following: a signal-to-noise ratio (SNR), an uplink path loss, a received signal strength indicator (RSSI), reference signal received power (RSRP), received signal code power (RSCP), precoding and layer quantity information, and sounding reference signal (SRS) resource indicator information.

2. The method according to claim 1, wherein a plurality of ports of the terminal device are in a one-to-one correspondence with a plurality of antennas, and the plurality of ports comprise the first port and the second port.

3. The method according to claim 1, further comprising:
   when the first information comprises the SNR, selecting, by the terminal device from the plurality of ports of the terminal device, a port with a largest SNR as the first port; or
   when the first information comprises the uplink path loss, selecting, by the terminal device from the plurality of ports of the terminal device, a port with a smallest uplink path loss as the first port; or
   when the first information comprises the RSSI, selecting, by the terminal device from the plurality of ports of the terminal device, a port with a largest RSSI as the first port; or
   when the first information comprises the RSRP, selecting, by the terminal device from the plurality of ports of the terminal device, a port with largest RSRP as the first port; or
   when the first information comprises the RSCP, selecting, by the terminal device from the plurality of ports of the terminal device, a port with largest RSCP as the first port.

4. The method according to claim 1, further comprising:
   when the first information comprises the SNR and the first port is not a port with a largest SNR in a plurality of uplink ports of the terminal device, selecting, by the terminal device from the plurality of ports of the terminal device, a port with a second largest SNR as the second port; or
   when the first information comprises the uplink path loss and the first port is not a port with a smallest uplink path loss in a plurality of uplink ports of the terminal device, selecting, by the terminal device from the plurality of ports of the terminal device, a port with a second smallest uplink path loss as the second port; or
   when the first information comprises the RSSI and the first port is not a port with a largest RSSI in a plurality of uplink ports of the terminal device, selecting, by the terminal device from the plurality of ports of the terminal device, a port with a second largest RSSI as the second port; or
   when the first information comprises the RSRP and the first port is not a port with largest RSRP in a plurality of uplink ports of the terminal device, selecting, by the terminal device from the plurality of ports of the terminal device, a port with second largest RSRP as the second port; or
   when the first information comprises the RSCP and the first port is not a port with largest RSCP in a plurality of uplink ports of the terminal device, selecting, by the terminal device from the plurality of ports of the terminal device, a port with second largest RSCP as the second port.

5. The method according to claim 1, further comprising:
   when determining, based on the first information, to use the first port and the second port to perform uplink sending, performing, by the terminal device, uplink sending through the first port by using third transmit power and performing uplink sending through the second port by using the third transmit power, the total transmit power of the terminal device being the calculated transmit power when uplink sending is performed through the first port and the second port by using the third transmit power; or
   performing uplink sending through the first port by using the maximum transmit power supported by the first port and performing uplink sending through the second port by using third transmit power; or
   performing uplink sending through the first port by using third transmit power and performing uplink sending through the second port by using the maximum transmit power supported by the second port; or
   performing uplink sending through the first port by using the maximum transmit power supported by the first port and performing uplink sending through the second port by using the maximum transmit power supported by the second port.

6. The method according to claim 1, the first transmit power being represented by $\min\{P_{max,j}, 10 \log(\hat{P}_{CH} - \hat{P}_{max,i})\}$, where $P_{max,j}$ represents the maximum transmit power of the second port, $\hat{P}_{CH}$ represents a linear value of the calculated transmit power, the linear value of the calculated transmit power being determined based on the calculated transmit power, $\hat{P}_{max,i}$ represents a linear value of the maximum transmit power of the first port, the linear value of the maximum transmit power of the first port being determined based on the maximum transmit power of the first port.

7. The method according to claim 1, further comprising:
determining, by the terminal device, that the first port and the second port meet a specific condition:
when the first information comprises the SNR, the specific condition comprises a difference between an SNR of the first port and an SNR of the second port is greater than a specified value, the SNR of the first port is greater than the SNR of the second port, and the specified value is greater than 0;
when the first information comprises the uplink path loss, the specific condition comprises a difference between an uplink path loss of the second port and an uplink path loss of the first port is greater than a specified value, the uplink path loss of the second port is greater than the uplink path loss of the first port, and the specified value is greater than 0;
when the first information comprises the RSSI, the specific condition comprises a difference between an RSSI of the first port and an RSSI of the second port is greater than a specified value, and the RSSI of the first port is greater than the RSSI of the second port, and the specified value is greater than 0;
when the first information comprises the RSRP, the specific condition comprises a difference between RSRP of the first port and RSRP of the second port is greater than a specified value, the RSRP of the first port is greater than the RSRP of the second port, and the specified value is greater than 0; or
when the first information comprises the RSCP, the specific condition comprises a difference between RSCP of the first port and RSCP of the second port is greater than a specified value, the RSCP of the first port is greater than the RSCP of the second port, and the specified value is greater than 0.

8. The method according to claim 1, further comprising:
determining, by the terminal device, that the first port and the second port do not meet the specific condition; and
performing uplink sending through the first port by using third transmit power, and performing uplink sending through the second port by using the third transmit power, the total transmit power of the terminal device is enabled to be the calculated transmit power when uplink sending is performed through the first port and the second port by using the third transmit power; or
performing uplink sending through the first port by using the maximum transmit power supported by the first port, and performing uplink sending through the second port by using the third transmit power; or
performing uplink sending through the first port by using the third transmit power, and performing uplink sending through the second port by using the maximum transmit power supported by the second port; or
performing uplink sending through the first port by using the maximum transmit power supported by the first port, and performing uplink sending through the second port by using the maximum transmit power supported by the second port, when the first information comprises the SNR, the specific condition comprises a difference between an SNR of the first port and an SNR of the second port is greater than a specified value, the SNR of the first port is greater than the SNR of the second port, and the specified value is greater than 0;
when the first information comprises the uplink path loss, the specific condition comprises a difference between an uplink path loss of the second port and an uplink path loss of the first port is greater than a specified value, the uplink path loss of the second port is greater than the uplink path loss of the first port, and the specified value is greater than 0;
when the first information comprises the RSSI, the specific condition comprises a difference between an RSSI of the first port and an RSSI of the second port is greater than a specified value, and the RSSI of the first port is greater than the RSSI of the second port, and the specified value is greater than 0;
when the first information comprises the RSRP, the specific condition comprises a difference between RSRP of the first port and RSRP of the second port is greater than a specified value, the RSRP of the first port is greater than the RSRP of the second port, and the specified value is greater than 0; or
when the first information comprises the RSCP, the specific condition comprises a difference between RSCP of the first port and RSCP of the second port is greater than a specified value, the RSCP of the first port is greater than the RSCP of the second port, and the specified value is greater than 0.

9. The method according to claim 5, wherein
the third transmit power is $P_{CH}-3$, where
$P_{CH}$ represents the calculated transmit power.

10. A terminal device, comprising:
a memory configured to store a computer program or instructions, and
a processor connected to the memory and configured to execute the computer program or the instructions to cause the terminal device to:
determine, based on first information, to use a first port to perform uplink sending;
when maximum transmit power supported by the first port is greater than calculated transmit power, controlling the first port to be used to perform uplink sending, the calculated transmit power being uplink transmit power indicated by a network device; and
when the maximum transmit power of the first port is less than the calculated transmit power, dividing uplink sending between the first port and a second port of the terminal device by controlling the first port to perform uplink sending by using the maximum transmit power supported by the first port, and controlling the second port of the terminal device to perform uplink sending by using first transmit power, total transmit power of the terminal device being enabled to be the calculated transmit power, or the first transmit power is maximum transmit power supported by the second port, wherein
the first information comprises at least one or more of the following: an SNR, an uplink path loss, an RSSI, RSRP, RSCP, precoding and layer quantity information, and SRS resource indicator information.

11. The terminal device according to claim 10, wherein a plurality of ports is in a one-to-one correspondence with a plurality of antennas, and the plurality of ports comprises the first port and the second port.

12. The terminal device according to claim 10, execution of the computer program or instructions by the processor cause the terminal device to:
   select, from the plurality of ports of the terminal device, a port with a largest SNR as the first port when the first information comprises the SNR; or
   select, from the plurality of ports of the terminal device, a port with a smallest uplink path loss as the first port when the first information comprises the uplink path loss; or
   select, from the plurality of ports of the terminal device, a port with a largest RSSI as the first port when the first information comprises the RSSI; or
   select, from the plurality of ports of the terminal device, a port with largest RSRP as the first port when the first information comprises the RSRP; or
   select, from the plurality of ports of the terminal device, a port with largest RSCP as the first port when the first information comprises the RSCP.

13. The terminal device according to claim 10, execution of the computer program or instructions by the processor cause the terminal device to:
   select, from the plurality of ports of the terminal device, a port with a second largest SNR as the second port when the first information comprises the SNR, and the first port is not a port with a largest SNR in a plurality of uplink ports of the terminal device; or
   select, from the plurality of ports of the terminal device, a port with a second smallest uplink path loss as the second port when the first information comprises the uplink path loss, and the first port is not a port with a smallest uplink path loss in a plurality of uplink ports of the terminal device; or
   select, from the plurality of ports of the terminal device, a port with a second largest RSSI as the second port when the first information comprises the RSSI, and the first port is not a port with a largest RSSI in a plurality of uplink ports of the terminal device; or
   select, from the plurality of ports of the terminal device, a port with second largest RSRP as the second port when the first information comprises the RSRP, and the first port is not a port with largest RSRP in a plurality of uplink ports of the terminal device; or
   select, from the plurality of ports of the terminal device, a port with second largest RSCP as the second port when the first information comprises the RSCP, and the first port is not a port with largest RSCP in a plurality of uplink ports of the terminal device.

14. The terminal device according to claim 10, execution of the computer program or instructions by the processor causes the terminal device to:
   when determining, based on the first information, to use the first port and the second port to perform uplink sending, control the first port to be used to perform uplink sending by using third transmit power, and control the second port to be used to perform uplink sending by using the third transmit power, wherein when uplink sending is performed through the first port and the second port by using the third transmit power, the total transmit power of the terminal device is enabled to be the calculated transmit power; or
   control the first port to be used to perform uplink sending by using the maximum transmit power supported by the first port and control the second port to be used to perform uplink sending by using third transmit power; or
   control the first port to be used to perform uplink sending by using third transmit power and control the second port to be used to perform uplink sending by using the maximum transmit power supported by the second port; or
   control the first port to be used to perform uplink sending by using the maximum transmit power supported by the first port and control the second port to be used to perform uplink sending by using the maximum transmit power supported by the second port.

15. The terminal device according to claim 10, wherein the first transmit power is represented by $\min\{P_{max,j}, 10\log(\hat{P}_{CH} - \hat{P}_{max,i})\}$, where
   $P_{max,j}$ represents the maximum transmit power of the second port, $\hat{P}_{CH}$ represents a linear value of the calculated transmit power, the linear value of the calculated transmit power is determined based on the calculated transmit power, $\hat{P}_{max,i}$ represents a linear value of the maximum transmit power of the first port, the linear value of the maximum transmit power of the first port is determined based on the maximum transmit power of the first port.

16. The terminal device according to claim 10, execution of the computer program or instructions by the processor causing the terminal device to:
   determine that the first port and the second port meet a specific condition,
   when the first information comprises the SNR, the specific condition comprises a difference between an SNR of the first port and an SNR of the second port is greater than a specified value, the SNR of the first port is greater than the SNR of the second port, and the specified value is greater than 0;
   when the first information comprises the uplink path loss, the specific condition comprises a difference between an uplink path loss of the second port and an uplink path loss of the first port is greater than a specified value, the uplink path loss of the second port is greater than the uplink path loss of the first port, and the specified value is greater than 0;
   when the first information comprises the RSSI, the specific condition comprises a difference between an RSSI of the first port and an RSSI of the second port is greater than a specified value, and the RSSI of the first port is greater than the RSSI of the second port, and the specified value is greater than 0;
   when the first information comprises the RSRP the specific condition comprises a difference between RSRP of the first port and RSRP of the second port is greater than a specified value, the RSRP of the first port is greater than the RSRP of the second port, and the specified value is greater than 0; or
   when the first information comprises the RSCP, the specific condition comprises a difference between RSCP of the first port and RSCP of the second port is greater than a specified value, the RSCP of the first port is greater than the RSCP of the second port, and the specified value is greater than 0.

17. The terminal device according to claim 10, execution of the computer program or instructions by the processor cause the terminal device to:
   determine that the first port and the second port do not meet the specific condition; and control the first port to perform uplink sending by using the third transmit power, and control the second port to perform uplink sending by using the third transmit power, wherein when uplink sending is performed through the first port and the second port by using the third transmit power, the total transmit power of the terminal device is enabled to be the calculated transmit power; or control the first port to be used to perform uplink sending by using the maximum transmit power supported by the first port and control the second port to perform uplink sending by using third transmit power; or control the first port to be used to perform uplink sending by using third transmit power and control the second port to perform uplink sending by using the maximum transmit power supported by the second port; or control the first port to be used to perform uplink sending by using the maximum transmit power supported by the first port and configure the second port to perform uplink sending by using the maximum transmit power supported by the second port, wherein when the first information comprises the SNR, the specific condition comprises a difference between an SNR of the first port and an SNR of the second port is greater than a specified value, the SNR of the first port is greater than the SNR of the second port, and the specified value is greater than 0;

when the first information comprises the uplink path loss, the specific condition comprises a difference between an uplink path loss of the second port and an uplink path loss of the first port is greater than a specified value, the uplink path loss of the second port is greater than the uplink path loss of the first port, and the specified value is greater than 0;

when the first information comprises the RSSI, the specific condition comprises a difference between an RSSI of the first port and an RSSI of the second port is greater than a specified value, and the RSSI of the first port is greater than the RSSI of the second port, and the specified value is greater than 0;

when the first information comprises the RSRP the specific condition comprises a difference between RSRP of the first port and RSRP of the second port is greater than a specified value, the RSRP of the first port is greater than the RSRP of the second port, and the specified value is greater than 0; or when the first information comprises the RSCP, the specific condition comprises a difference between RSCP of the first port and RSCP of the second port is greater than a specified value, the RSCP of the first port is greater than the RSCP of the second port, and the specified value is greater than 0.

18. The terminal device according to claim 14, wherein the third transmit power is $P_{CH}-3$; and $P_{CH}$ represents the calculated transmit power; and min{a, b} represents that a smallest value of a and b is used.

19. An electronic chip connected to a memory in an electronic device, the memory being configured to store a computer program or instructions; and a processor configured to execute the computer program or the instructions to perform the following method:

determine, based on first information, to use a first port to perform uplink sending;

when maximum transmit power supported by the first port is greater than calculated transmit power, controlling the first port to perform uplink sending, the calculated transmit power being uplink transmit power indicated by a network device; and when the maximum transmit power of the first port is less than the calculated transmit power, controlling the first port to perform uplink sending by using the maximum transmit power supported by the first port, and controlling a second port of the terminal device to perform uplink sending by using first transmit power, when transmission is performed through the first port by using the maximum power and uplink sending is performed through the second port by using the first transmit power, total transmit power of the terminal device is enabled to be the calculated transmit power, or the first transmit power is maximum transmit power supported by the second port, wherein the first information comprises at least one or more of the following: an SNR, an uplink path loss, an RSSI, RSRP, RSCP, precoding and layer quantity information, and SRS resource indicator information.

20. The electronic chip according to claim 19, wherein a plurality of ports are in a one-to-one correspondence with a plurality of antennas, and the plurality of ports comprise the first port and the second port.

* * * * *